(12) United States Patent (10) Patent No.: US 10,705,670 B2
Deets, Jr. (45) Date of Patent: Jul. 7, 2020

(54) MESSAGE COMPOSITION INDICATORS

(71) Applicant: Facebook, Inc., Menlo Park, CA (US)

(72) Inventor: Charles Donald Deets, Jr., Palo Alto, CA (US)

(73) Assignee: FACEBOOK, INC., Menlo Park, CA (US)

(*) Notice: Subject to any disclaimer, the term of this patent is extended or adjusted under 35 U.S.C. 154(b) by 235 days.

(21) Appl. No.: 15/295,715

(22) Filed: Oct. 17, 2016

(65) Prior Publication Data

US 2018/0107342 A1   Apr. 19, 2018

(51) Int. Cl.
*G06F 3/14* (2006.01)
*G06F 3/0481* (2013.01)
*H04L 12/58* (2006.01)

(52) U.S. Cl.
CPC ............ *G06F 3/0481* (2013.01); *H04L 51/04* (2013.01); *H04L 51/043* (2013.01); *H04L 51/34* (2013.01); *H04L 51/08* (2013.01)

(58) Field of Classification Search
CPC .......... G06F 3/04817; G06F 8/61; G06F 9/30; G06F 3/14
USPC ................ 715/752, 753; 709/204, 205, 206; 705/37
See application file for complete search history.

(56) References Cited

U.S. PATENT DOCUMENTS

| | | | | |
|---|---|---|---|---|
| 5,594,859 A * | 1/1997 | Palmer | ................ | G06F 3/04847 348/E7.081 |
| 5,990,887 A * | 11/1999 | Redpath | .................. | H04L 29/06 709/204 |
| 6,772,195 B1 * | 8/2004 | Hatlelid | ............. | G06F 3/04815 345/419 |
| 7,281,215 B1 * | 10/2007 | Canfield | ................ | G06Q 10/10 715/752 |
| 2003/0158900 A1 * | 8/2003 | Santos | .................. | H04M 3/567 709/205 |
| 2005/0165893 A1 * | 7/2005 | Feinberg | ............... | G06F 11/302 709/205 |
| 2006/0064646 A1 * | 3/2006 | Kelso | ...................... | H04L 51/04 715/772 |
| 2009/0222523 A1 * | 9/2009 | Williams | ............... | H04L 51/04 709/206 |
| 2011/0131593 A1 * | 6/2011 | Scott | .................... | H04N 21/252 725/9 |
| 2014/0067965 A1 * | 3/2014 | Yamakawa | ............. | H04L 51/04 709/206 |
| 2014/0280603 A1 * | 9/2014 | Rideout | .................. | H04W 4/21 709/205 |
| 2014/0310143 A1 * | 10/2014 | Singer | .................... | G06Q 40/04 705/37 |
| 2015/0007061 A1 * | 1/2015 | Mandre | ................... | H04L 51/04 715/753 |

(Continued)

OTHER PUBLICATIONS

Apache Wave (Incubating)—http://incubator.apache.org/wave/.
Apache Wave—Wikipedia; https://en.wikipedia.org/wiki/Apache_Wave.

*Primary Examiner* — Ruay Ho
(74) *Attorney, Agent, or Firm* — Keller Jolley Preece

(57) ABSTRACT

The present disclosure is directed toward systems and methods for providing and dynamically adjusting message composition indicators. The disclosed systems and methods provide users of electronic messaging systems, such as electronic messaging systems, with information regarding the message composition activities of other users.

20 Claims, 13 Drawing Sheets

(56) References Cited

U.S. PATENT DOCUMENTS

2016/0149839 A1\* 5/2016 Yi ...................... H04L 67/1095
709/206

\* cited by examiner

MESSAGE COMPOSITION INDICATORS

CROSS REFERENCE TO RELATED APPLICATIONS

N/A

BACKGROUND

Electronic messaging has become commonplace with the widespread use of computing devices, such as mobile computing devices. Device users have become accustomed to utilizing text messages, emails, instant messages, and other forms of electronic messages to communicate with each other. For example, users now send and receive messages using any number of electronic messaging and other electronic messaging systems (e.g., by way of electronic messaging and other electronic messaging applications running on or accessed using smart phones or other mobile devices). In order to send such a message, a first user generally selects a desired application and enters text and/or other media (e.g., photos, videos, EMOJIs, audio clips, etc.) to send to a second user. The second user can then respond using a corresponding mobile application running on a computing device of the second user.

Existing messaging applications and systems, however, rarely provide much of a sense of one another's presence in the conversation when the first user and second user are messaging each other. For example, existing applications often present indications of when messages are delivered and read, but provide no additional indication of other users' presence in the conversation. Additionally, existing applications generally give no indication of a user's activity in composing a message beyond merely indicating whether he or she has started to compose or is composing the message. Accordingly, a user typically has no way of knowing to what extent others are participating in the conversation. To illustrate, conventional messaging applications provide communicating users very little indication regarding the users' messaging on their respective user devices. This can result in confusion when, for example, two or more users send messages simultaneously or start to "talk over" one another within a conversation. Moreover, a user may waste time waiting around for a response mistakenly believing that another user is actively composing a message.

Thus, there are several disadvantages with regard to conventional electronic messaging methods and systems.

SUMMARY

One or more embodiments described herein provide benefits and solve one or more of the foregoing or other problems in the art with electronic messaging systems and methods. For example, the disclosed electronic messaging system provides a greater sense of another user's presence and activity within a messaging application by providing users dynamic message composition indicators. In accordance with one or more embodiments, the system detects attributes of messages being composed between a first user and a second user within a messaging conversation (e.g., a communication thread), and provides visual indications of the detected attributes and changes in messages as they are composed (e.g., by way of graphical message composition indicators).

Specifically, in accordance with one or more embodiments described herein, a system determines that a first user is composing a message to a second user using a first client device. The system then provides a message composition indicator to the second user by way of a second client device to indicate to the second user that the first user is composing the message. The system then detects (e.g., based on one or more actions of the first user on the first client device) an increase in size of the message being composed by the first user. In response to the detected increase in size of the message, the system causes the message composition indicator to dynamically increase in size (e.g., as displayed on the second client device). In one or more embodiments, the message composition indicator includes a graphical bar (e.g., a progress bar) that increases in size with the growth of the message as the sender composes it. Thus, the system can provide real-time updates to a recipient as a sender composes a message and the recipient need not wonder regarding an unknown status of the message composition.

Additional features and advantages of the present application will be set forth in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1:
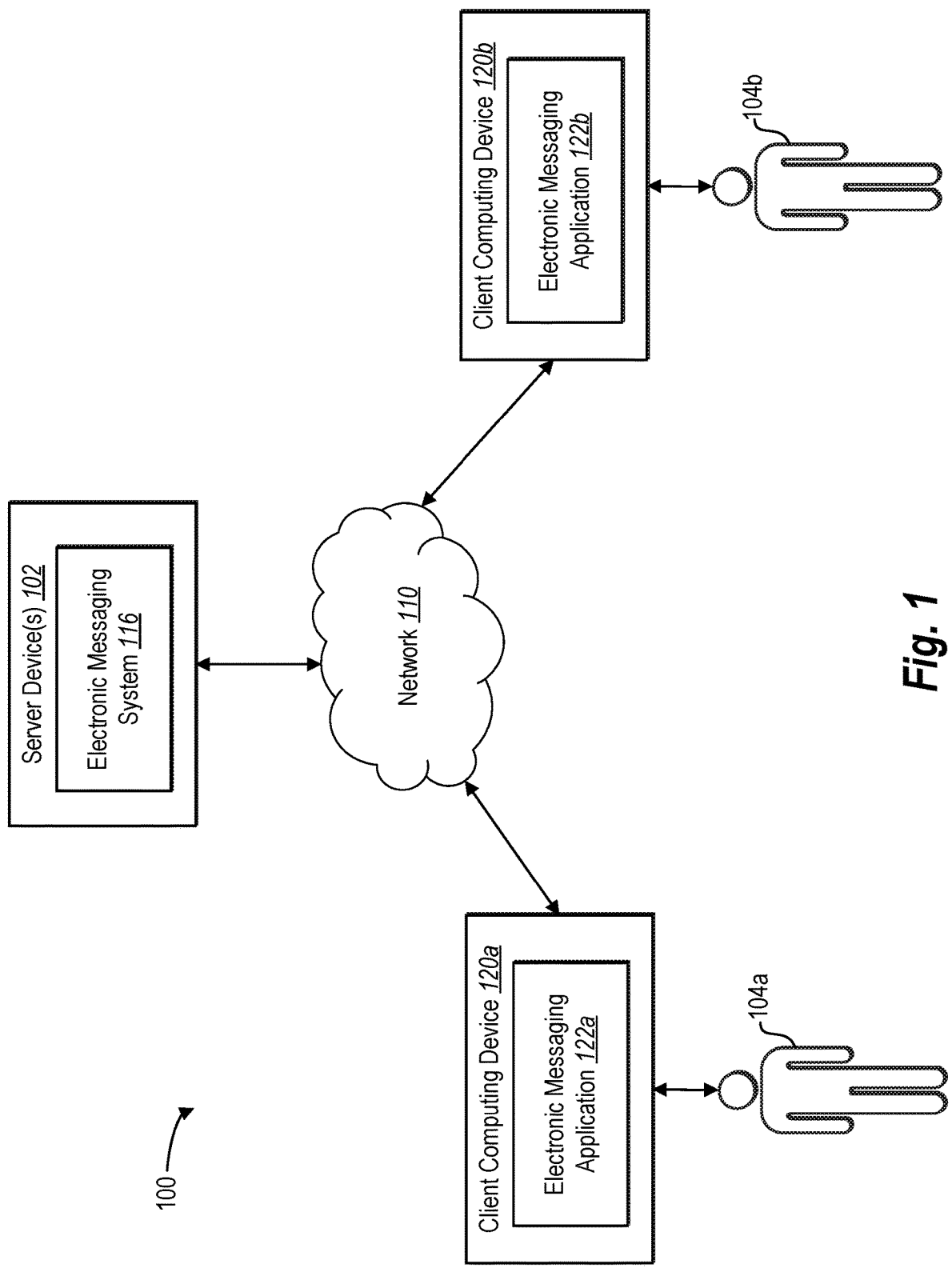
FIG. 1 illustrates a block diagram of an example message composition indicator system in accordance with one or more embodiments.

One or more embodiments described herein provide benefits and/or solve one or more of the foregoing or other problems in the art with electronic messaging systems and methods. For example, in accordance with one or more embodiments of this disclosure, a messaging system can provide a message composition indicator (e.g., by way of a graphical user interface of a messaging application) that indicates a size, growth, and/or other attributes of a message being composed using an electronic message application (e.g., an electronic messaging application or other electronic messaging application, system, or service). In some embodiments, the disclosed system detects message composition activity (e.g., addition of text or other content to the message) from a sender on a sender client device and then provides a message composition indicator by way of a graphical user interface displayed at a recipient client device based on the detected activity. Further, the system dynamically adjusts one or more visual attributes (e.g., a size, a color, a location, a shape, or a motion) of the message composition indicator to indicate one or more changes in the message being composed. To illustrate, in accordance with one or more embodiments, the disclosed system detects an increase in size (e.g., an addition of text) of a message being composed and adjusts a size (e.g., a length and/or height) of a message composition indicator to reflect the detected increase in size of the message. Accordingly, for example, as the message increases in size, the system dynamically adjusts the message composition indicator to indicate the size increases to the recipient. Once the sender completes and sends the message, the system then removes the message composition indicator and replaces it with the sent message (e.g., within the graphical user interface on the recipient's client device).

In accordance with one or more additional or alternative embodiments, the disclosed system detects one or more additional attributes of a message being composed by a sender on a sender client device and adjusts one or more attributes of the message composition indicator to make the recipient aware of the one or more additional attributes. For example, in some embodiments, the system detects that the sender is searching for and/or including (e.g., attaching) secondary content (e.g., a photo, a video, a GIF, an EMOJI, a file, a link, etc.) and adjusts the message composition indicator to visually indicate this to the recipient. For example, the system might add one or more icons or other graphical elements to the message composition indicator to indicate that the sender is searching for and/or attaching content to the message, and/or to indicate one or more attributes of the content (e.g., to indicate a type of the content, a source of the content, or any other characteristic of the content). For example, if a sender is searching for a photo to include in a message, in some embodiments the system adds a photo or camera icon to the message composition indicator.

The disclosed messaging system can utilize a number of different triggers, conditions, and/or heuristics based on detected activity of a sender to determine when and how to adjust visual attributes of a message composition indicator. For example, in some embodiments, the system can determine to adjust a message composition indicator in response to each character added to a message by a sender, in response to each word added to the message by the sender, in response to a particular character (e.g., a space, a period, or a comma) added to the message by the sender, in response to a threshold number of characters (e.g., every 10 characters) or words (e.g., every 2 words) added to the message by the sender, in accordance with time intervals (e.g., every 5 seconds), in response to the sender's selection of an option for adding content to the message (e.g., an option to add a photograph, an audio clip, a video clip, or a link to the message), or in response to any other suitable triggering event or activity associated with the sender's composition of the message.

Once the disclosed messaging system determines to adjust the message composition indicator (e.g., based on a sender's activity that satisfies one or more triggering conditions), the system can adjust any number of visual attributes of the message composition indicator to indicate one or more attributes of the message and composition thereof. For example, the system can adjust a size of the message composition indicator (e.g., to indicate an increase in size of the message), a color of the message composition indicator (e.g., to indicate a rate of growth of the message), add a graphic (e.g., icon) to the message composition indicator (e.g., to indicate the sender is adding content to the message), and/or any other visual attribute of the message composition indicator to indicate any attributes of the message or detected activity of the sender. In some embodiments, the system makes adjustments to the message composition indicator that are proportional to or directly representative of changes to the message. For example, the system can proportionally increase a size of the message composition indicator based on the growth and size of the message. In other embodiments, the system makes adjustments to the message composition indicator that are only indicative of, but not necessarily proportional to changes in the message. For example, the system might make lock-step increment size increases to the message composition indicator that are triggered by but not equivalent or proportional to size increases to the message. In yet further embodiments, the system increases a size of the message composition indicator by arbitrary increments as the sender continues to compose the message so as not to reveal the true length of the message or any increase in size thereof.

In some embodiments, a message composition indicator comprises a graphical bar (e.g., a progress bar) to indicate a size, progressive growth, and/or status of the message being composed. As the system detects changes in the size of the message being composed by the sender, the system can increase a size (e.g., a length and/or height) of the graphical bar accordingly. To illustrate, the system can increase a length of the graphical bar to indicate an increasing size of a first line of the message being composed (e.g., up to a maximum length of the graphical bar), and then increase a height of the graphical bar to indicate the addition of lines to the message. In some embodiments, the system doubles the height of the graphical bar to indicate a second line of text being added to the message. In yet further embodiments, the system caps a height of the graphical bar (e.g., at double or triple the original height), so that any additional increases in size of the message do not result in increases in the size of the graphical bar.

In some embodiments, to maintain semi-transparence of user action, the system displays a graphical bar to the receiver as the sender composes the message to indicate the size of the message, without revealing the message content. In some embodiments, the graphical bar only increases in size when the sender adds content to the message, and does not decrease in size if the sender deletes message content. This enables the sender to maintain a degree of privacy during composition of the message while also providing the receiver a sense of the sender's presence in the conversation. When the sender indicates (e.g., by pushing a "send" button) intent to send the message, the system then sends the message to the receiver, thereby allowing the receiver to read the message content.

The embodiments disclosed herein provide a number of advantages to messaging system users. For example, even before users receive messages, the disclosed system provides the users with more information regarding a sender's activities and the messages being composed than is conventionally available. Specifically, as a sender composes and adds content to a message (e.g., by adding text or attaching other content to the message), the system provides and dynamically updates a message composition indicator to keep a recipient informed regarding the composition of the message. Accordingly, the system provides the recipient a greater sense of the first user's presence and activity in a communication session. In particular, the system provides the recipient information regarding the sender's activities, but without explicitly revealing each action the sender performs (e.g., without revealing the actual text and other content being added to the message), as will be further explained below.

In at least one embodiment, the systems and corresponding processes disclosed herein can be implemented by way of an electronic messaging system. For example, in some embodiments, an electronic messaging system implements the disclosed system for providing message composition indicators to users of the electronic messaging system as they communicate one with another. To illustrate, the electronic messaging system can detect a sender's activity in composing a message by detecting the sender's interactions with an electronic messaging application on the sender's client device. Further, the electronic messaging system can provide a recipient a message composition indicator by way of a graphical user interface displayed on the recipient's client device (e.g., within an electronic messaging application on the recipient's client device). In alternative embodiments, any electronic messaging system can implement the features disclosed herein.

As mentioned above, the systems and methods disclosed herein provide message composition indicators to users of an electronic messaging or other electronic messaging system regarding the composition of electronic messages. An electronic message can include one or more types of content. For example, an electronic message can include text (e.g., inputted by a sender using a mobile device or other client device) and/or secondary content. As used herein, the term "secondary content" includes any content other than mere text. Examples of secondary content include images, video, audio, applications, files, location information, GIFs, EMOJIs, stickers, links or any other data or content that can be included in an electronic message.

FIG. 1 illustrates a schematic diagram of an example environment and implementation of a message composition indicator system 100 ("system 100"). As illustrated in FIG. 1, the message composition indicator system 100 can be implemented with respect to an electronic messaging system 116 running on one or more server devices 102 and corresponding client computing devices 120a and 120b respectively running messaging applications 122a and 122b. Also as illustrated in FIG. 1, the users 104a and 104b may interact with the client computing devices 120a and 120b to communicate with each other by way of the electronic messaging system 116. Each of the client computing devices 120a and 120b may access the electronic messaging system 116 via the messaging applications 122a and 122b, as described below.

The client computing devices 120a and 120b and the electronic messaging system 116 can communicate via the network 110, which may include one or more networks and may use one or more communication platforms or technologies suitable for transmitting data and/or communication signals. In one or more embodiments, the network 110 may include the Internet or World Wide Web. The network 110, however, can include various other types of networks that use various communication technologies and protocols, such as a corporate intranet, a virtual private network (VPN), a local area network (LAN), a wireless local network (WLAN), a cellular network, a wide area network (WAN), other telecommunications networks, or a combination of two or more such networks. Although FIG. 1 illustrates a particular arrangement of the client computing devices 120a and 120b, the electronic messaging system 116, the server device 102, and the network 110, various additional arrangements are possible. For example, the client computing devices 120a and 120b may directly communicate with the electronic messaging system 116, bypassing the network 110. Additional details relating to the network 110 are explained below with reference to FIG. 12.

As illustrated in FIG. 1, the users 104a and 104b can use the message composition indicator system 100 to engage in activity related to messaging one another and/or additional users of the electronic messaging system 116. The users 104a and 104b may be individuals (i.e., human users), businesses, groups, or other entities. Although FIG. 1 illustrates two users 104a and 104b, it is understood that the electronic messaging system 116 can allow a plurality of additional users to exchange communications via corresponding additional client computing devices.

Any of the users 104a or 104b can be a sender/creator of a message or electronic content to be sent or shared via the electronic messaging system 116, and any of the users 104a or 104b can be a recipient of a message sent via the electronic messaging system 116. In certain embodiments, the electronic messaging system 116 can ensure the users 104a and 104b are connected (e.g., are "friends") via the electronic messaging system 116 before they can send and receive electronic messages to/from each other. Further, the electronic messaging system 116 can share content from users 104a and 104b in accordance with privacy settings set by each of users 104a and 104b. In additional or alternative embodiments, the electronic messaging system 116 may simply ensure that users sending and receiving communications merely be active users of the electronic messaging system 116. In one or more embodiments, the electronic messaging system 116 comprises or is part of an electronic messaging system.

The client computing devices 120a and 120b may include various types of computing devices. For example, the client computing devices 120a and 120b can include a mobile device such as a mobile telephone, a smartphone, a personal digital assistant, a table, a laptop, a smart wearable, or a non-mobile device such as a desktop, a server, and/or another type of computing device. Further, the client computing devices 120a and 120b may run dedicated messaging or electronic messaging applications (e.g., such as the messaging applications 122a and 122b as described below) associated with the electronic messaging system 116 to access content (e.g., posts, messages, digital media, etc.). Additional details with respect to the client computing devices 120a and 120b and the electronic messaging system 116 are discussed below with respect to FIGS. 11 and 12.

As discussed above, the systems and methods laid out with reference to FIG. 1 can facilitate communications between a first electronic messaging system user and a second electronic messaging system user via an electronic messaging system.

Figure 2:
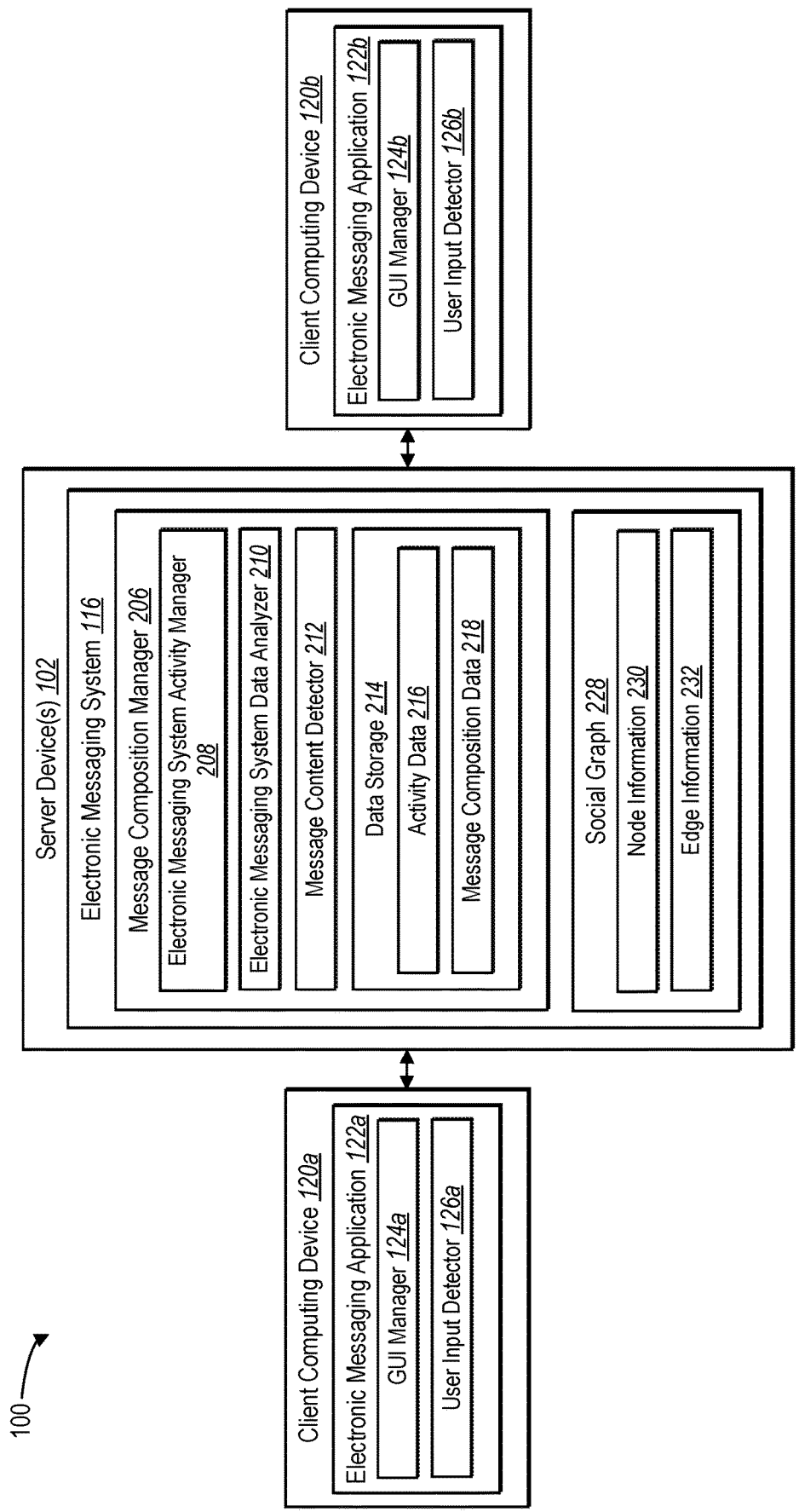
FIG. 2 illustrates a detailed schematic diagram of the message composition indicator system of FIG. 1 in accordance with one or more embodiments.

FIG. 2 illustrates a schematic diagram illustrating an example embodiment of the message composition indicator system 100 described above with reference to FIG. 1. As shown in FIG. 2, the system 100 includes various components for performing the processes and features described herein. For example, as shown in FIG. 2, the system 100 includes, but is not limited to, one or more server devices 102, an electronic messaging system 116, a message composition manager 206, and at least one client computing device 120a and 120b. The message composition manager 206 includes, but is not limited to, an electronic messaging system activity manager 208, an electronic messaging system data analyzer 210, a message content detector 212, and a data storage 214, which includes activity data 216 and message composition data 218. The electronic messaging system 116 also includes a social graph 228, which includes node information 230 and edge information 232. Each client computing device 120a and 120b includes a messaging applications 122a and 122b, which include GUI managers 124a and 124b and user input detectors 126a and 126b, respectively.

The electronic messaging system 116, each of the components 208-232 can be implemented using a computing device including at least one processor executing instructions that cause the system 100 to perform the processes described herein. In some embodiments, the components of the electronic messaging system 116 can be implemented by a single server device 102, or across multiple server devices 102. Additionally or alternatively, a combination of one or more server devices and one or more client devices can implement the components of the electronic messaging system 116 and/or the client computing device 120a and 120b. Furthermore, in one embodiment, the components 102, 116, 120a, 120b, 122a, 122b, 124a, 124b, 126a, 126b, and/or 106-232 can comprise hardware, such as a special-purpose processing device to perform a certain function. Additionally or alternatively, the components 102, 116, 120a, 120b, 122a, 122b, 124a, 124b, 126a, 126b, and/or 106-1032 can comprise a combination of computer-executable instructions and hardware.

In one or more embodiments, the messaging applications 122a and 122b can be a native application installed on client computing device 120a and/or 120b. For example, the messaging applications 122a and 122b may be mobile applications that install and run on a mobile device, such as a smart phone, a tablet, etc. Alternatively, the messaging applications 122a and 122b can be desktop applications, widgets, or other forms of native computer programs. Alternatively, the messaging applications 122a and 122b may be remote applications accessed by the client computing devices 120a and 120b. For example, the messaging applications 122a and 122b may be web applications that are executed within a web browser of the client computing devices 120a and 120b.

As mentioned above, and as shown in FIG. 2, the messaging applications 122a and 122b include a graphical user interface (or simply "GUI") manager 124a and 124b, respectively. The GUI managers 124a and 124b each provide, manage, and/or control a graphical user interface (or simply "user interface") that allows a user of client computing device 120a and 120b respectively, to compose, view, and submit electronic messaging system posts, etc. Furthermore, the GUI managers 124a and 124b provide a user interface that facilitates display of messages within a communication session between the users of client computing devices 120a and 120b. Likewise, the GUI managers 124a and 124b provide each user an interface that facilitates the display of an electronic messaging system user's message feed or an electronic messaging system user's "wall."

More specifically, the GUI managers 124a and 124b can facilitate the display of a user interface (e.g., by way of a display device associated with the client computing device 120a or 120b). For example, the GUI managers 124a and 124b each may compose the user interface of a plurality of graphical components, objects, and/or elements that allow a user to compose, send, and receive electronic messages, electronic messaging system posts, etc. More particularly, the GUI managers 124a and 124b may direct the client computing devices 120a and 120b to display a group of graphical components, objects, and/or elements that enable a user to view messages between users, electronic messaging system posts, digital media, etc.

In addition, the GUI managers 124a and 124b direct the client computing devices 120a and 120b to display one or more graphical objects, controls, applications, or elements that facilitate user input for composing and sending messages, posts, and/or viewing digital media. To illustrate, the GUI managers 124a and 124b each provide a user interface that allows a user to provide user input to the messaging applications 122a and 122b, respectively. For example, the GUI managers 124a and 124b can provide one or more user interfaces that allow a user to input one or more types of content into an electronic messaging system message, post, etc.

The GUI managers 124a and 124b also facilitate the input of text or other data to be included in an electronic messaging system message, post, comment, etc. For example, the GUI managers 124a and 124b can provide a user interface that includes a touch display keyboard or any other touch-responsive graphical elements. A user can interact with the touch display keyboard using one or more touch gestures to input text or other types of input to be included in an electronic messaging system post, or comment. In addition to text, the user interface including the touch display keyboard can facilitate the input of various other characters, symbols, icons, or other information.

Furthermore, the GUI managers 124a and 124b provide graphical user interfaces that display a message feed including a message composition indicator and/or graphical bar associated with a message currently being composed. For example, in one embodiment, the GUI manager 124b provides a message feed to an electronic messaging system user of client computing device 120b containing one or more electronic messaging system messages from a user of client computing device 120a via the electronic messaging system. Similarly, in response to a detected input from the user of client computing device 120a, the GUI manager 124b can display on the graphical user interface of client computing device 120b a message composition indicator indicating the input of the user of client computing device 120a.

As further illustrated in FIG. 2, the messaging applications 122a and 122b can include user input detectors 126a and 126b, respectively. In one or more embodiments, the user input detectors 126a and 126b can detect, receive, and/or facilitate user input in any suitable manner. In some examples, the user input detectors 126a and 126b can detect one or more user interactions with respect to the user interface. As referred to herein, a "user interaction" means a single interaction, or combination of interactions, received from a user by way of one or more input devices.

For example, the user input detectors 126a and 126b detect a user interaction from a keyboard, mouse, touch pad, touch screen, and/or any other input device on client computing device 120a or 120b, respectively. In the event the client computing device 120a or 120b includes a touch screen, the user input detectors 126a or 126b can detect one or more touch gestures (e.g., swipe gestures, tap gestures, pinch gestures, or reverse pinch gestures) from a user that forms a user interaction. In some examples, a user can provide the touch gestures in relation to and/or directed at one or more graphical objects or graphical elements of a user interface.

The user input detectors 126a and 126b may additionally, or alternatively, receive data representative of a user interaction. For example, the user input detectors 126a and 126b may receive text input from a user, one or more user configurable parameters from the user, one or more user commands from the user, and/or any other suitable user input. The user input detectors 126a and 126b may receive input data from one or more components of the electronic messaging system 116, or from one or more remote locations.

The messaging applications 122a and 122b perform one or more functions in response to the user input detectors 126a and 126b detecting user input and/or receiving other data. Generally, a user can control, navigate within, and otherwise use the electronic messaging applications 122a and 122b by providing one or more user inputs that the user input detectors 126a and 126b can detect. For example, in response to the user input detectors 126a and 126b detecting user input, one or more components of the electronic messaging application 122a and 122b allow a user to select or input information for inclusion in an electronic message. Additionally, in response to the user input detectors 126a and 126b detecting user input, one or more components of the messaging applications 122a and 122b allow a user to navigate through one or more user interfaces to review a message feed, view digital media, etc.

As illustrated in FIG. 2, the message composition indicator system 100 includes the electronic messaging system 116 hosted by a server device 102. The electronic messaging system 116 provides electronic messaging system messages (whether text or otherwise) to a graphical user interface (e.g., a profile, a message feed, or "wall") of one or more users of the electronic messaging system 116. For example, one or more embodiments may present a user with an electronic messaging system message feed. In one or more embodiments, the electronic messaging system 116 may organize the electronic messaging system messages by recency, geographically, by interest groups, according to a relationship coefficient between the user and the co-user, etc. Additionally, in one or more embodiments, the user may download content from the message feed.

Additionally, in one embodiment, the electronic messaging system 116 transmits messages between a user of client computing device 120a and a user of client computing device 120b. For example, in response to the user of client computing device 120a submitting an electronic messaging system message to the electronic messaging system 116, the electronic messaging system 116 updates the electronic messaging system message feed of the user of client computing device 120b. Accordingly, over time, the electronic messaging system 116 fills the message feed of a particular electronic messaging system user with messages.

As mentioned above, and as illustrated in FIG. 2, the electronic messaging system 116 further includes the message composition manager 206. In one or more embodiments, and as will be discussed in further detail below, the message composition manager 206 monitors and analyzes electronic messaging system activity in order to detect when a user composes a message and further detect the attributes of the message. The message composition manager 206 includes the electronic messaging system activity manager 208, the electronic messaging system data analyzer 210 and the message content detector 212.

In one or more embodiments, the electronic messaging system activity manager 208 communicates with the electronic messaging system 116 to send and receive various types of information. For example, the electronic messaging system activity manager 208 communicates with the electronic messaging system 116 to send or receive information related to actions performed by electronic messaging system users, as well as information related to the electronic messaging system users. To illustrate, the electronic messaging system activity manager 208 receives information related to the electronic messaging system activities engaged in by one or more electronic messaging system users. For instance, an electronic messaging user may compose messages to another user, click links, submit posts, view digital media, etc. Accordingly, the electronic messaging system activity manager 208 receives, monitors, and tracks information related to any and all electronic messaging system activities performed by an electronic messaging system user.

In one or more embodiments, the electronic messaging system activity manager 208 identifies the content of messages, posts, etc. as well as any structured data associated with a message, post, comment, etc. As used herein, "structured data" includes any data that is structured into specific groups, fields, or categories and/or associated with particular aspects of a post or a user. Structured data includes metadata associated with node and edge information related to an electronic messaging system message, information related to the message author, information related to a particular item featured in the message, and interaction information (e.g., shares, comments, likes) related to the message within the electronic messaging system 116. To illustrate, structured data for an electronic messaging system post may include the message author's name, the content of the message, the message author's location, information related to a group or message feed where the message author submitted the message, or any other specific types of information/data associated with the message. The structured data may also include various media content such as digital video, images, audio, etc. Using this structured data, the electronic messaging system can facilitate the insertion of "rich" objects within a message feed or elsewhere, such rich objects providing more information and/or content than typical textual messages.

As mentioned above, the electronic messaging system activity manager 208 can receive information related to an electronic messaging system user including demographic information associated with the user. In one or more embodiments, a user's demographic information can include, but is not limited to, the user's gender, age, education, location, hometown, birthday, employment, salary, family and romantic relationships, and so forth. Additionally, the user's demographic information can be related to the user's personal interests (e.g., favorite books, movies, restaurants, etc.). The electronic messaging system activity manager 208 identifies this information through an analysis of the user's electronic messaging system profile, account information, or via other electronic messaging system activities in which the user engages.

As mentioned above, and as illustrated in FIG. 2, the message composition manager 206 also includes an electronic messaging system data analyzer 210. As discussed above, the electronic messaging system activity manager 208 monitors electronic messaging system activity and identifies messages and attributes (e.g., size, length, content) of the messages. Accordingly, in one or more embodiments, the electronic messaging system data analyzer 210 monitors all electronic messaging system messages to detect messages between users.

As the electronic messaging system activity manager 208 monitors electronic messaging system activity to detect messages between users, the electronic messaging system data analyzer 210 analyzes the identified messages in order to determine one or more qualities or attributes of the particular message. For example, if the electronic messaging system activity manager 208 identifies a message that is specific to a certain conversation between the user of client computing device 120*a* and the user of client computing device 120*b*, the electronic messaging system data analyzer 210 will analyze all information related to that identified message in order to determine qualities or attributes of that message. To illustrate, the message may include a growing number of characters as the user of the client computing device 120*a* composes the message as well as information indicating that the user of client computing device 120*a* is searching for secondary content to include in the message. In one or more embodiments, the electronic messaging system data analyzer 210 analyzes all of this information to determine qualities or attributes of the message (e.g., message size, message length, file size, an indication that the user composing the message is searching for secondary content, etc.), whereupon the electronic messaging system 116 provides the information to client computing device 120*b*. GUI manager 124*b* may then display to the user of the client computing device 120*b* the dynamic status indicator and/or graphical bar with indicators to reflect the information sent by the electronic messaging system 116 to the client computing device 120*b*.

Additionally, when the electronic messaging system activity manager 208 determines that the user of client computing device 120*a* is continuing to compose the message, the electronic messaging system data analyzer 210 may detect an increase in the size of the message. For example, the electronic messaging system data analyzer 210 detects when the user of client computing device 120*a* enters a space into a message, whereupon electronic messaging system data analyzer 210 detects the length of the preceding word, which length is identified as an increase in the size of the message. Electronic messaging system 116 then provides an indication of the increase in size of the message to client computing device 120*b*. In one embodiment, electronic messaging system data analyzer 210 identifies a predefined number of characters composed by the user of client computing device 120*a* as an increase in size of message, whereupon electronic messaging system 116 provides an indication of the increase in size to client computing device 120*b*. In another embodiment, electronic messaging system data analyzer 210 uses an arbitrary number of characters composed by the user of client device 120*a* as an increase in size of the message.

In one or more embodiments, the electronic messaging system data analyzer 210 may also detect the addition of a new line in the message. The new line may be added upon the user of the client computing device 120*a* composing a predefined number of characters in the message or else may be added upon the user of client computing device 120*a* selectively entering a new line into the message. The electronic messaging system 116 may then provide an indication to client computing device 120*b* that a new line has been added to the message, whereupon GUI manager 124*b* may display to the user of client computing device 120*b* graphical changes (e.g. like those described above with reference to FIGS. 3-6) to the message composition indicator and/or graphical bar indicating the addition of a new line to the message.

In one or more embodiments, the electronic messaging system data analyzer 210 continuously determines the updated size (e.g., character length, physical length, etc.) of the message as the message is further composed by the user of the client computing device 120*a*. The electronic messaging system 116 continuously provides indications to the client computing device 120*b* of the increases in size of the message, whereupon GUI manager 124*b* displays a message composition indicator indicating the increases in size of the message to the user of client computing device 120*b*.

In one or more embodiments, the electronic messaging system activity manager 208 also detects that the user of client computing device 120*a* is searching for or attaching secondary content to include in the message. The message content detector 212 detects that the user of the client computing device 120*a* is searching for secondary content to include in the message, whereupon the electronic messaging system 116 provides indications to client computing device 120*b* that the user of client computing device 120*a* is searching for secondary content to include in the message. GUI manager 124*b* displays a graphical searching indicator to the user of client computing device 120*b* that the user of client computing device 120*a* is searching for secondary content to include in the message. In one or more embodiments, the message content detector 212 detects that the user of client computing device 120*a* is attaching secondary content to a message, whereupon electronic messaging system 116 provides an indication to client computing device 120*b* that the user of client computing device 120*a* is attaching secondary content to the message. GUI 124*b* then displays to the user of client computing device 120*b* a graphical attaching indicator indicating that the user of client computing device 120*a* is attaching secondary content to the message.

In one or more embodiments, the message content detector 212 detects that the user of client computing device 120*a* is utilizing an image capturing device to capture an image and/or video to include in a message. Electronic messaging system 116 provides indications to client computing device 120*b* that the user of client computing device 120*a* is utilizing an image capturing device to capture an image to include in the message, whereupon GUI manager 124*b* displays to the user of client computing device 120*b* a graphical image capturing indicator indicating that the user of client computing device 120*a* is utilizing an image capturing device to capture an image to include in the message.

In the same or other embodiments, the electronic messaging system activity manager 208 detects that the user of client computing device 120*a* is composing a message to a user other than the user of client computing device 120*b*. In this case, electronic messaging system data analyzer 210 determines that the user of client computing device 120*b* is not the intended recipient, whereupon the electronic messaging system 116 provides an indication to client computing 120*b* indicating that the user of client computing device 120*a* is composing a message to a different user. GUI manager 124*b* displays to the user of client computing device 120*b* the message composition indicator with a graphical representation indicating that the user of client computing device 120*b* is not the intended recipient, and that the user of client computing device 120*a* is composing the message to a different user.

Furthermore, as mentioned above, and as illustrated in FIG. 2, the message composition manager 206 also includes a data storage 214. As shown, the data storage 214 includes activity data 216 and message composition data 218. In one or more embodiments, the activity data 216 can include data representative of electronic messaging system activity information, such as described herein. Similarly, in one or more embodiments, the message composition data 218 can include data representative of search information (e.g., clusters of repositories, search queries, etc.), such as described herein.

Additionally, in one or more embodiments and as illustrated in FIG. 2, the electronic messaging system 116 may include a social graph 228 for representing and analyzing a plurality of users, actions, and concepts. Node information 230 of the social graph 228 can store node information comprising, for example, nodes for users and nodes for repositories. Edge information 1032 of the social graph 228 can store edge information comprising relationships between nodes and/or actions occurring within the electronic messaging system 116. Further detail regarding the electronic messaging system 116, social graphs, edges, and nodes is presented below with respect to FIGS. 12 and 13.

Figure 3A:
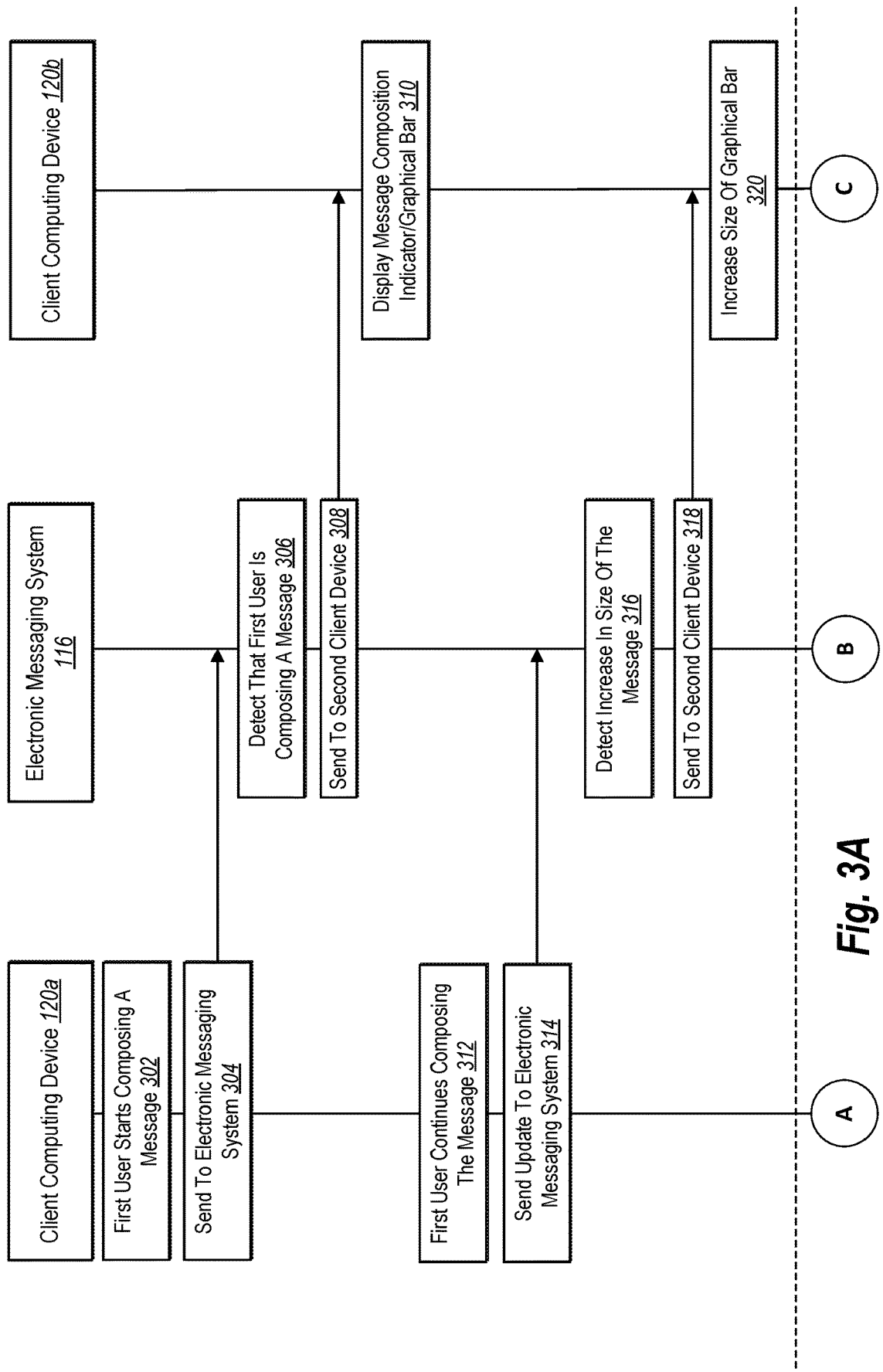
FIGS. 3A-3C illustrate a sequence-flow diagram in accordance with one or more embodiments.
Figure 3B:
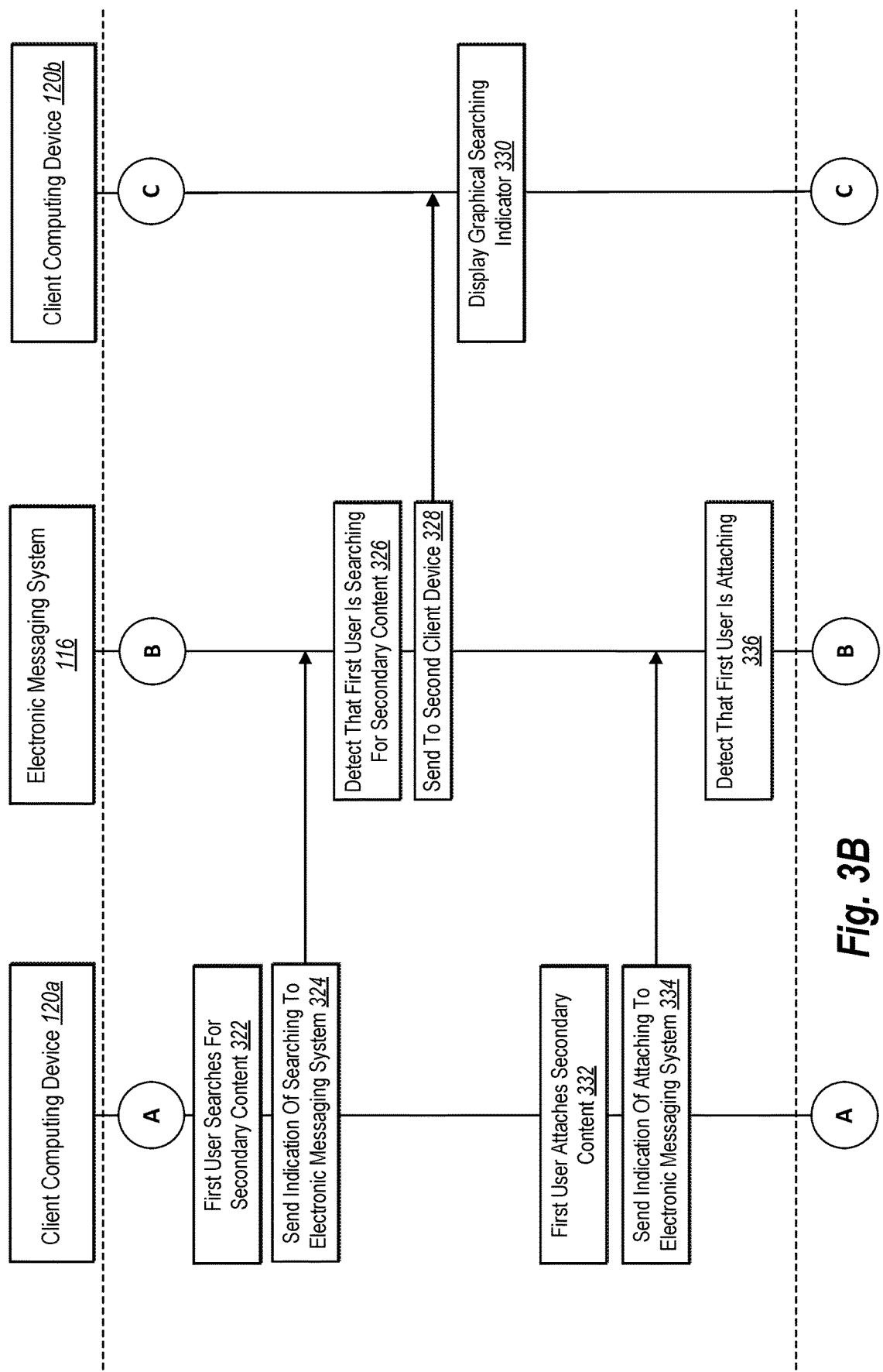
Figure 3C:
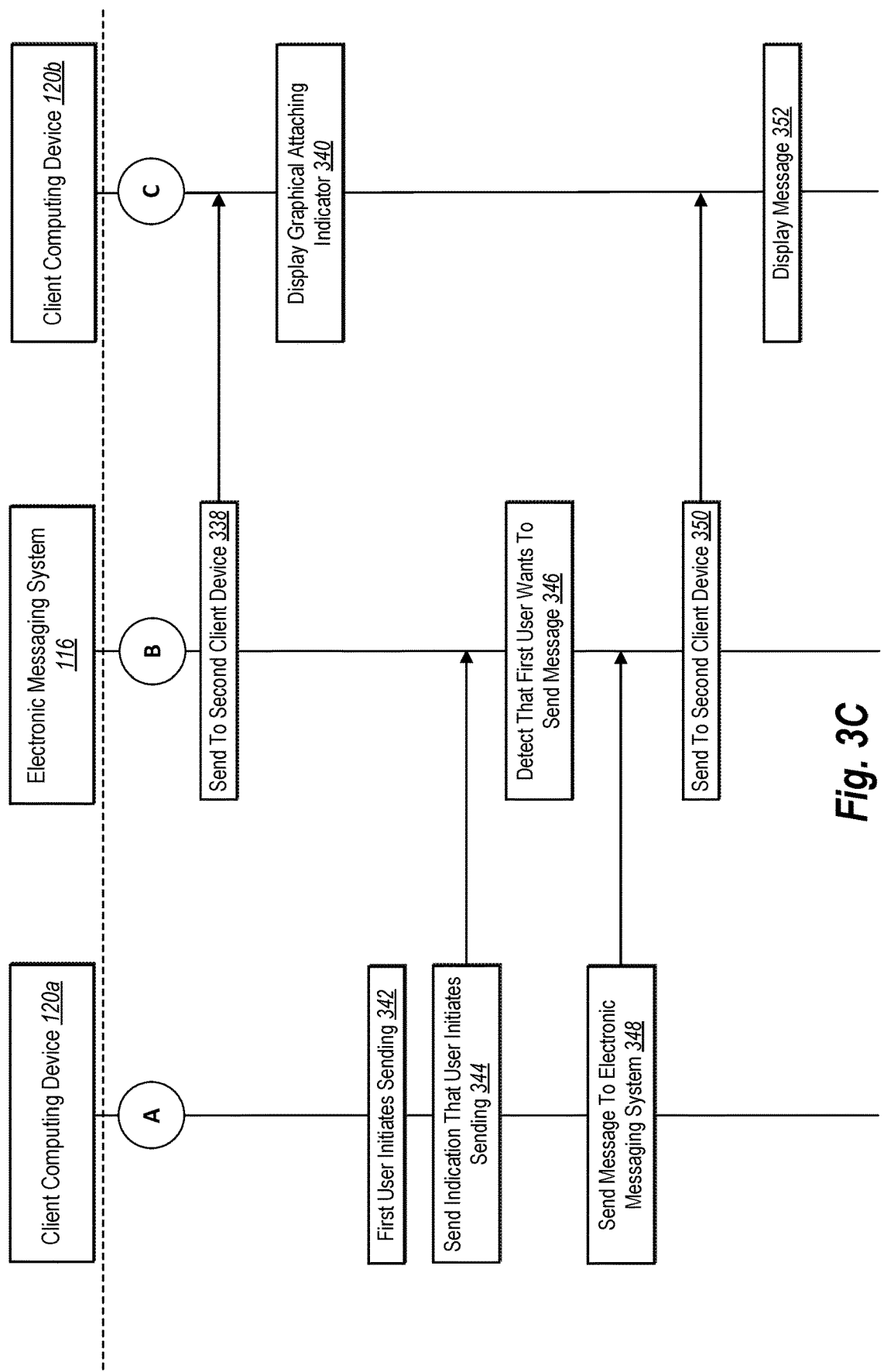
Figure 5:
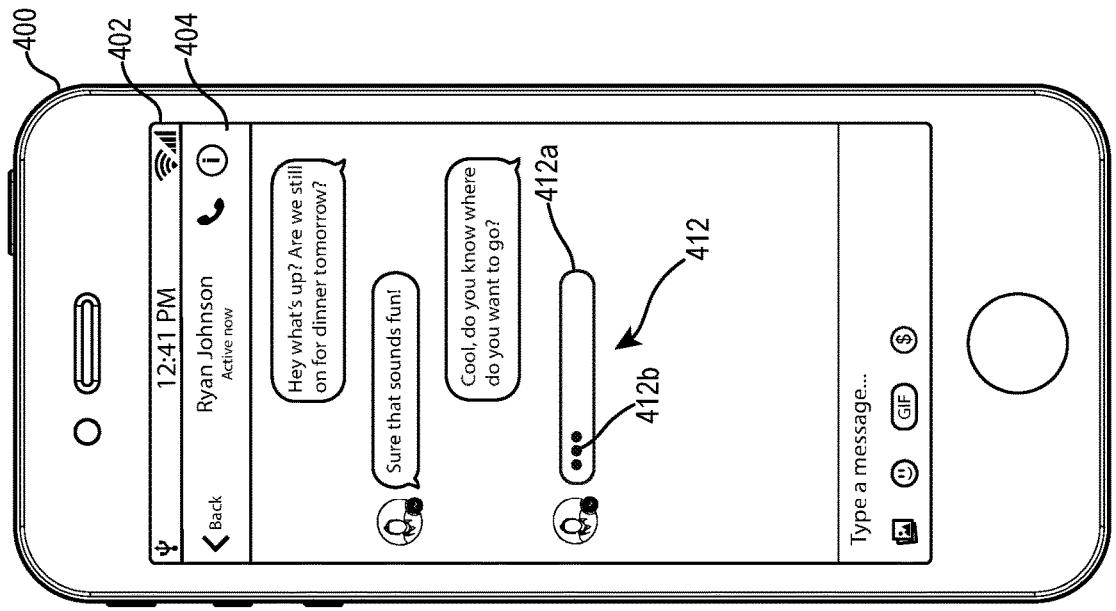
FIGS. 4-7 illustrate a series of example graphical user interfaces in accordance with one or more embodiments.

FIGS. 3A-3C illustrate an example sequence diagram of one or more example embodiments of processes implemented by the system 100 discussed above. Consistent with the system 100 illustrated in FIG. 1, FIGS. 3A-3C illustrate the first user 104a utilizing the first client computing device 120a, the second user utilizing the second client computing device 120b, and the electronic messaging system 116 facilitating communications between the first client computing device 120a and the second client computing device 120b. Additionally, as will be set forth in more detail below, FIGS. 3A-3C illustrate one or more embodiments for providing dynamic message composition indicators to users 104a and 104b by way of the first client computing device 120a and the second client computing device 120b.

In one or more embodiments, as shown in FIG. 3A, the illustrated process begins with the first user 104a interacting with the first client computing device 120a to start composing a message to the second user 104b using the messaging application 122a (302) in the form of typing, touch gestures, voice recognition, etc. In one embodiment, the first client sends information (304) to the electronic messaging system 116 indicating that the first user 104a is composing a message, whereupon electronic messaging system 116 detects the user input to compose the message (306). In turn, the electronic messaging system 116 sends information (308) to the second client computing device 120b indicating to the second user 104b that the first user 104a is composing a message. In some embodiments, the information sent (308) by the electronic messaging system 116 to the second client computing device 120b also includes metrics such as character count, typing rate, type of content being added to the message or comment, time of composition, etc.

As shown in FIG. 3A, the second client computing device 120b displays (310) the message composition indicator to the second user 104b, thereby indicating that the first user 104a is composing a message. In some embodiments, the message composition indicator can include a graphical bar indicating a size of the message being composed.

As the first user 104a continues composing the message (312) to the second user 104b, the first client computing device 120a constantly sends updates indicating the changes (314) to the message to the electronic messaging system 116, whereupon the electronic messaging system 116 detects increases in size (316) of the message and sends information (318) to the second client computing device 120b indicating the increase in size of the message. The second client computing device 120b then increases the size of the graphical bar (320) displayed on the second client computing device 120b, reflecting the increase in size of the message being composed by the first user 104a. Alternatively, the first client computing device 120a may first detect the increase in size of the message as the first user 104a composes the message before sending the update (314) to the electronic messaging system 116. The electronic messaging system 116 may then send an indication (318) to the second client computing device 120b indicating the increase in size of the message, whereupon the second client computing device 120b may increase the size of the graphical bar (320), rendered to the display of the second client computing device 120b, to reflect the increase in size of the message.

The electronic messaging system 116 constantly monitors the composition of the message by receiving indications of input made by the first user 104a on the first client computing device 120a and detecting changes within the message. The electronic messaging system 116 further instructs the second client computing device 120b to reflect the increasing size of the message. Reflecting the increasing size of the message on the second client computing device 120b can include displaying the message composition indicator as a graphical bar expanding horizontally as the first user 104a continues to input message content. In some embodiments, the graphical bar expands in increments equal to the length of each word added to the message. In some embodiments, the system expands the graphical bar by the length of each composed word in a number of ways, including using a delineator such as a space, comma, period, or other character to prompt the system to then expand the graphical bar by the length of the previously composed word. Additionally or alternatively, increasing the size of the graphical bar may include expanding the graphical bar in set increments each time the first user 104a composes a predefined number of characters in the message. Else, increasing the size of the graphical bar may include expanding the graphical bar horizontally by arbitrary increments as the first user 104a continues to compose the message, so as not to reveal as much information about the message to the second user 104b during the composition process. Steps 412-320 repeat for as long as the first user 104a continues composing the message.

In one or more embodiments, as shown in FIG. 3B, the first user 104a inputs message content other than text during composition of the message. In these embodiments, the first user 104a searches for secondary content (322), whereupon the first client computing device sends an indication that the first user 104a is performing actions other than composing the message, such as searching for secondary content (324) to add to the message to the electronic messaging system 116. The electronic messaging system 116 then detects that the first user 104a is searching for secondary content (326) to add to the message and sends an indication (328) to the second client computing device 120b indicating that the first user 104a is searching for secondary content to include in the message. The second client computing device 120b displays (330), to the second user 104b, a graphical indicator representative of the action being performed by the first user 104a, i.e., searching for secondary content, and indicating to the second user 104b that the first user 104a is searching for secondary content to include in the message. In other embodiments, detecting that the first user is searching for secondary content (326) is performed by the first client computing device 120a before sending an indication that the first user 104 a is searching for secondary content (324) to the electronic messaging system 116, whereupon the electronic messaging system 116 sends information (including, for example, typing rate, total composition time, type of secondary content, etc.) to the second client computing device 120b indicating that the user of first client computing device 120a is searching for secondary content to include in the message.

As shown in FIG. 3B, first user 104*a* attaches secondary content (332) to the message during composition, whereupon the first client computing device 120*a* sends an indication (334) to the electronic messaging system 116 that the first user 104*a* is attaching secondary content to include in the message. In some embodiments, the first client computing device 120*a* sends information (334) to the electronic messaging system 116 further indicating the type of secondary content being attached. The electronic messaging system 116 then detects that the first user 104*a* is attaching secondary content (336) to include in the message, whereupon the electronic messaging system 116 then provides an indication (338) to the second user 104*b*, by way of the second client device 120*b*, indicating that the first user 104*a* is attaching secondary content to the message and further indicating what type of secondary content is being attached. The second client computing device 120*b* displays (340), to the second user 104*b*, a graphical indicator representative of the attaching action (e.g., a graphical attaching indicator) being performed by the first user 104*a*, indicating to the second user 104*b* that the first user 104*a* is attaching secondary content to the message. In some embodiments, the second client computing device 120*b* may further indicate the type of secondary content being attached.

In one or more embodiments (not shown), the first user 104*a* may utilize an image capturing device (e.g., a camera) to capture an image to include in the message. In these embodiments, the first client computing device 120*a* sends an indication to the electronic messaging system 116 that the first user 104*a* is utilizing an image capturing device to capture an image to include in the message. The electronic messaging system 116 then detects that the first user 104*a* is utilizing an image capturing device and provides an indication to the second user 104*b* by way of the second client computing device 120*b* that the first user 104*a* is utilizing an image capturing device. The second client computing device 120*b* displays to the second user 104*b* a graphical image capturing indicator indicating that the first user 104*a* is utilizing an image capturing device to capture an image to include in the message. In other embodiments, detecting that the first user is utilizing an image capturing device may be performed by the first client computing device 120*a* within system 100.

In FIG. 3C, the first user 104*a* initiates message sending (342) after composition of the message is complete (e.g., by clicking a "send" button). The first client computing device 120*a* sends an indication that the first user 104*a* wants to send the message (344) to the electronic messaging system 116. The electronic messaging system 116 detects (346) that the first user 104*a* has initiated sending (342) the message to the second user 104*b*. The first client computing device 120*a* then sends the message (348) to the electronic messaging system 116, whereupon the electronic messaging system 116 then sends (350) the message, including any message content as well as all secondary content, to the second client computing device 120*b*. Client computing device 120*b* then displays (352) the message, including any secondary content or other content to the second user 104*b*.

As will be described in more detail below, the components of the message composition indicator system 100 as described with regard to FIG. 1 as well as the event sequence described in FIGS. 3A-3C can provide, along and/or in combination with other components, one or more graphical user interfaces ("GUIs"). In particular, the components can allow a user to interact with a collection of display elements for a variety of purposes. Specifically, FIGS. 4-9 and the description that follows illustrate various example embodiments of the GUIs and features that are in accordance with general principles as described above.

Figure 4:
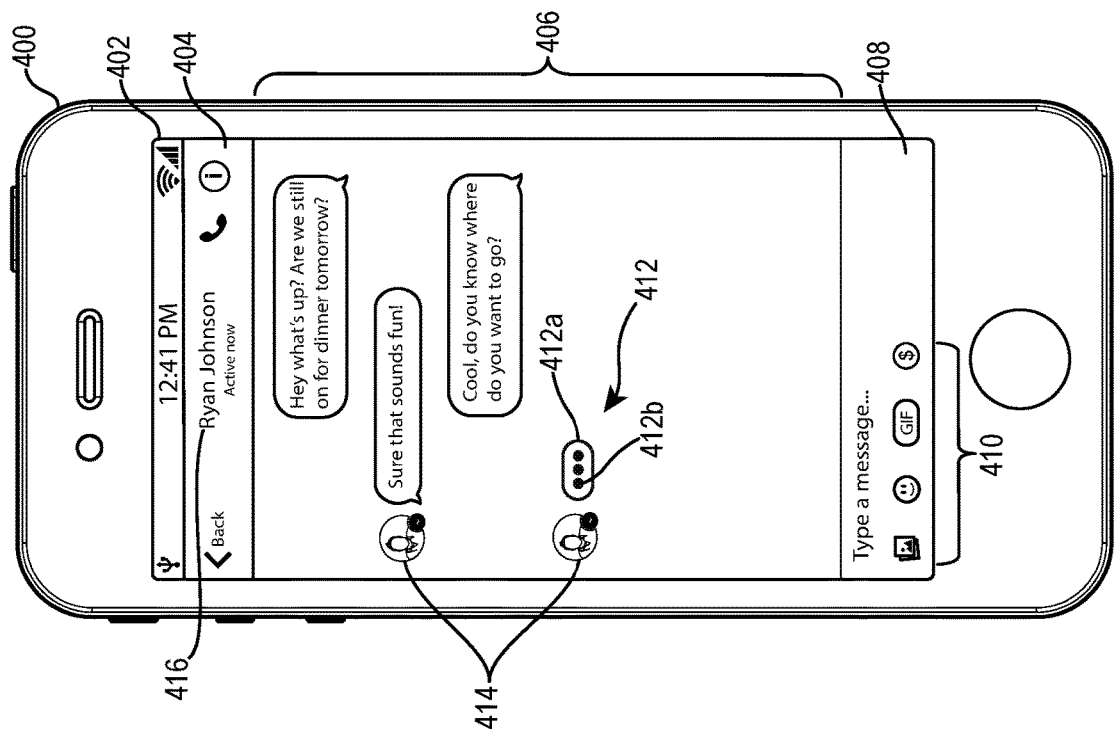

For example, FIGS. 4-9 illustrate various views of GUIs provided at one of the client computing devices 120*a* and 120*b* by way of the electronic messaging application 122*a* and 122*b*, respectively. As mentioned above, in some embodiments, a client computing device (i.e., the client computing device 120*a* or 120*b*) implements and/or provides features from the message composition indicator system 100. For example, FIG. 4 illustrates a client computing device 400 of an electronic messaging system user (e.g., one of the users 104*a* or 104*b*). As shown, the client computing device 400 is a handheld device, such as a mobile phone device (e.g., a smartphone). In additional or alternative examples, however, any other suitable computing device, such as, but not limited to, a tablet device, larger wireless device, laptop or desktop computer, a personal digital assistant device, and/or any other suitable computing device can perform one or more of the processes and/or operations described herein.

As illustrated in FIG. 4, the client computing device 400 includes a touch screen display 402 that can display a user interface and by way of which user input may be received and/or detected. In particular, the client computing device 400 can be a touch screen device. In one or more embodiments, a touch screen device may be the client computing device 120*a* or 120*b* with at least one surface upon which a user may perform touch gestures (e.g., a laptop, a tablet computer, a personal digital assistant, a media player, a mobile phone, etc.). Additionally or alternatively, the client computing device 400 may include any other suitable input device, such as a touch pad or those described below in reference to FIG. 11.

In FIG. 4, the touch screen display 402 of the client computing device 400 displays a messaging GUI 404 provided by the messaging applications 122*a* and 122*b* installed thereon. In one or more embodiments, a GUI manager as described above with reference to FIG. 2 provides the messaging GUI 404 in order to provide a display of a message feed 406 of the user of the client computing device 400. As shown, the message feed 406 includes various messages of the user associated with the user of the client computing device 400 and other users with whom the user may be communicating (e.g., friends of the user of the client computing device 400).

In other embodiments, the touch screen display of client computing device 400 displays a GUI 404 in order to provide a display of a profile, newsfeed, or "wall." In these embodiments, the newsfeed or wall include various messages, posts, or comments associated with posts of one or more users associated with the user of client computing device 400. For example, the user of client computing device 400 may post a picture to his or her newsfeed or wall, whereupon another user may post a comment associated with the picture on the newsfeed or wall.

As described above, the message feed 406 includes messages between the user of client computing device 400 and those with whom he or she is communicating. Messages are displayed within the message feed 406 from top to bottom, in the order in which they are sent from each user involved in the messaging session, thus reflecting a conversation between the two or more users. In other embodiments, messages are organized by recency, geographical location, by interest groups, according to a relationship coefficient between the user and a co-user, etc. In still other embodiments, message feed 406 is a newsfeed or wall upon which the user of client computing device 400 creates posts that users may comment on.

Messages composed by the user of the client computing device 400 are distinguished from messages composed by other users with whom he or she is communicating in a number of ways. For example, messages composed by the user of the client computing device 400 may be displayed within text bubbles placed in different locations within GUI 404. In some embodiments, messages composed by the user of client device 400 have a different background color than messages composed by users with whom he or she is communicating. Additionally or alternatively, messages composed by other users are accompanied by a photo or other representative user identifier 414, thereby designating the particular user that composed each message in the message feed 406. Additionally or alternatively still, a user name 416 may be displayed within messaging GUI 404 to indicate the user associated with a particular messaging conversation currently displayed within message feed 406.

Within the messaging GUI 404 on the client computing device 400 as shown in FIG. 4, a text input field 408 is displayed wherein the user of the client computing device 400 enters text to compose a message. In conjunction with the text input field 408, a secondary content pane 410 is also presented to the user of the client computing device 400 whereby the user searches for and select secondary content to include within a message.

As described above, a message composition indicator 412 is displayed within the message feed 406 next to the user identifier 414 to indicate to the user of the client computing device 400 that the user associated with the user identifier 414 is currently composing a message. The message composition indicator 412 also includes a graphical bar 412*a* like that shown in FIG. 5 to indicate increases in size of the message. Additionally, the message composition indicator 412 includes a typing awareness indicator 412*b* that indicates to the second user 104*b* that the first user 104*a* is composing a message. The typing awareness indicator 412*b* is sometimes referred to as a "bouncing ellipsis," but can also be any other indicator—graphical, text, or otherwise—to indicate to the user of client computing device 400 that the user associated with user identifier 414 is currently composing a message or comment.

In other embodiments, the message composition indicator 412 is a comment composition indicator associated with a comment on a post of the user of client computing device 400. The comment composition indicator includes a graphical bar 412*a* and a typing awareness indicator 412*b* to indicate to the user of client computing device 400 that the user associated with user identifier 414 is currently composing a comment associated with a post of the newsfeed or wall of the user of client computing device 400.

Figure 6:
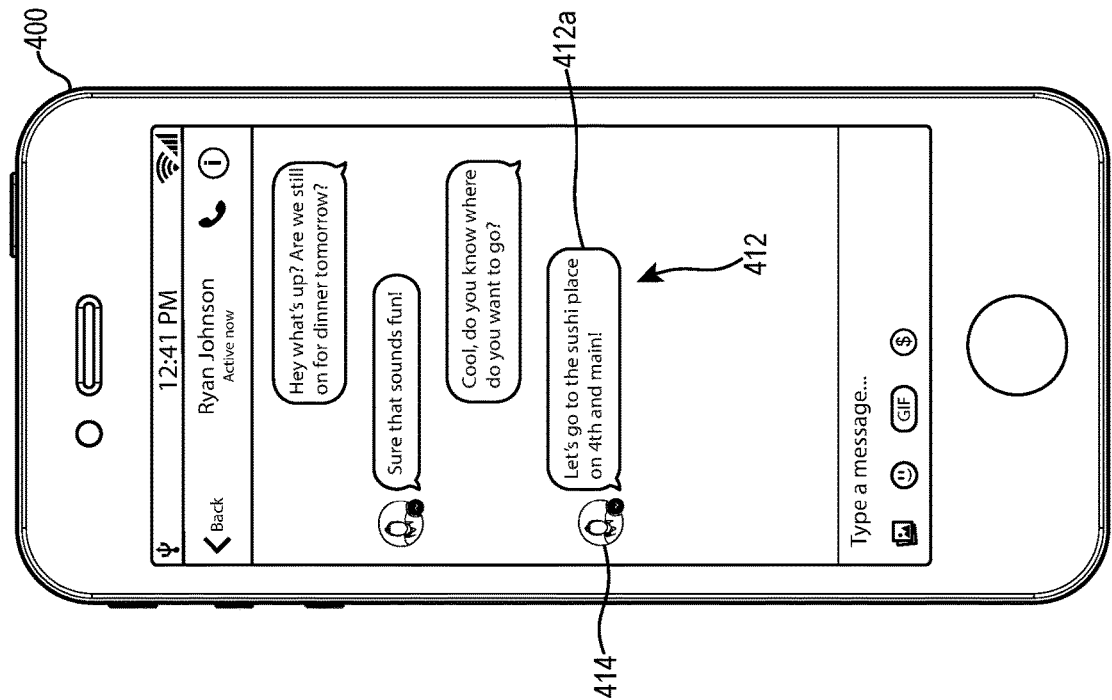

As described above, FIG. 5 shows the message composition indicator 412 including the graphical bar 412*a* as it increases in size as displayed on the client computing device 400. The graphical bar 412*a* increases in size (e.g. in a horizontal direction and/or in a vertical direction), as described above, with the composition of a message to be received by the client computing device 400. As shown in FIG. 4, the graphical bar 412*a* expands horizontally as the user associated with user identifier 414 continues to compose the message. The expansion of the graphical bar 412*a* can be performed by the system 100 in the various ways described above (e.g., continuously as the message is composed, by increments equal to the length of each composed word upon entry of a space or other delineator, by set increments whenever the user associated with user identifier 414 composes a predefined number of characters, or by arbitrary increments as the user associated with user identifier 414 composes the message). As the user associated with user identifier 414 continues composing the message to be received by the client computing device 400, the graphical bar 412*a* displayed within the messaging GUI 404 continues to expand until the message reaches a second line of text as shown in FIG. 6. In one or more embodiments, the user composing the message searches for secondary content to include in the message, and upon finding secondary content he or she wishes to include in the message, the user composing the message attaches the secondary content to the message as described below with reference to FIGS. 8A-8B. In the same or other embodiments, the user composing the message may utilize an image capturing device (e.g., camera) to capture an image to include in the message as described below with reference to FIG. 8C.

In some embodiments, the message composition indicator 412 is a comment composition indicator including the graphical bar 412*a* and the typing awareness indicator 412*b*. The graphical bar 412*a* increases in size with the composition of a comment associated with a post associated with the newsfeed or wall of the user of client computing device 400, and the graphical bar 412*a* expands horizontally as the user associated with user identifier 414 continues to compose the comment.

FIG. 6 shows the message composition indicator 412 including the graphical bar 412*a* as the message continues onto a second line of text. As described above, when the message reaches a second line of text, the graphical bar 412*a* expands vertically to indicate to the user of the client computing device 400 that the message has increased in size and now includes one or more additional lines of text. In one or more embodiments, the graphical bar 412*a* expands vertically with each new line added to the message by the user associated with user identifier 414. In other embodiments, the graphical bar 412*a* expands vertically one time (so that the graphical bar 412*a* includes enough vertical space to include a total of two lines of text, regardless of whether the message is larger than that) to indicate to the user of the client computing device 400 that the message being composed by the user associated with user identifier 414 includes two or more lines of text. The client computing device 400 displays the graphical bar 412*a* until the user associated with user identifier 414 who is composing the message sends the message to the user of the client device 400 as shown in FIG. 6.

Figure 7:
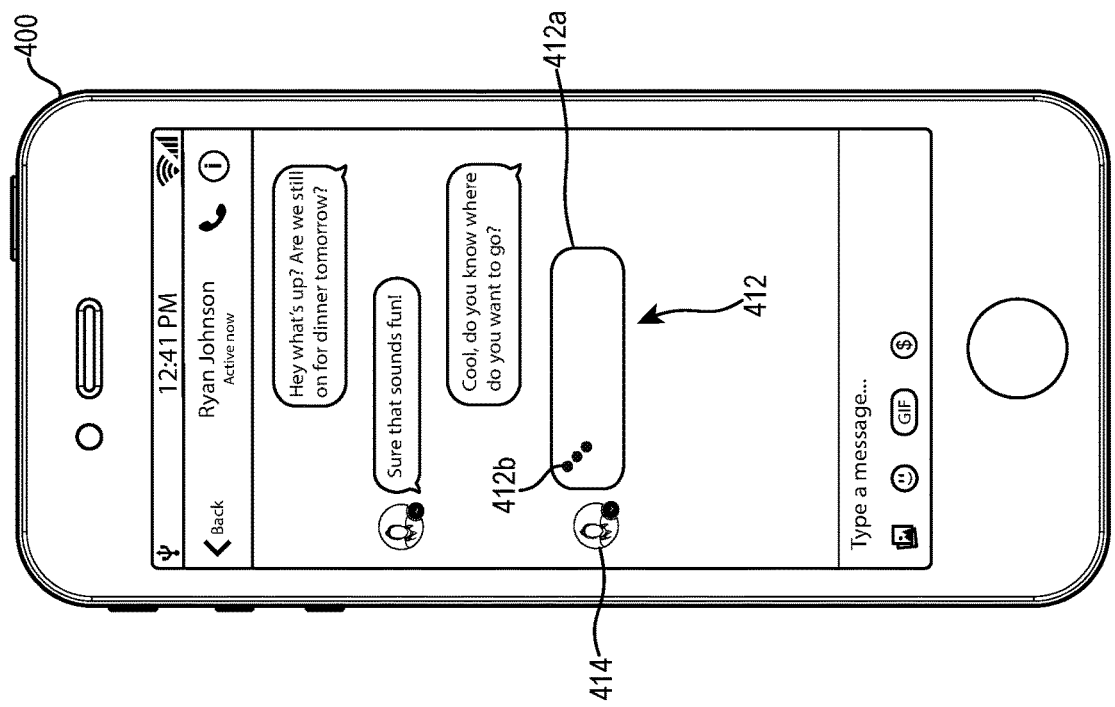

FIG. 7 shows the client computing device 400 where the messaging GUI 404 displays the message to the user of the client computing device 400 after the message is sent by user associated with user identifier 414 and received by the client computing device 400. Messaging GUI 404 displays the message to the user of the client computing device 400, including any text composed as well as any secondary content included in the message.

Figure 8A:
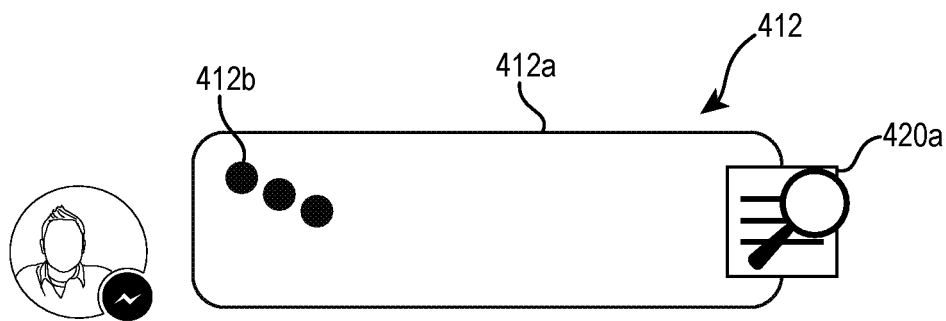
FIGS. 8A-8C illustrate example message composition indicators in accordance with one or more embodiments.
Figure 8B:
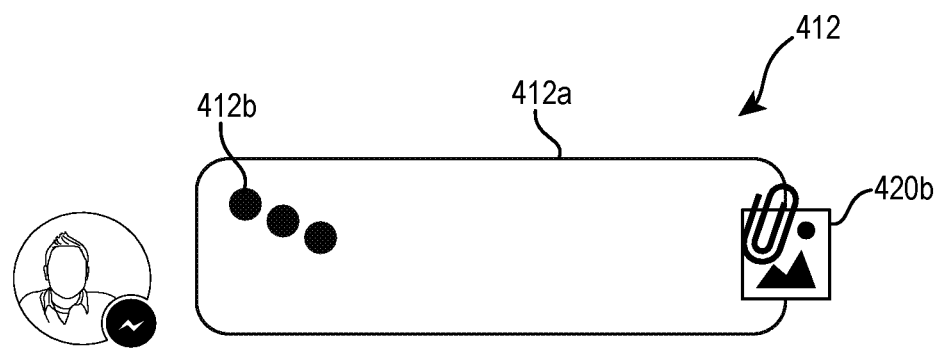
Figure 8C:
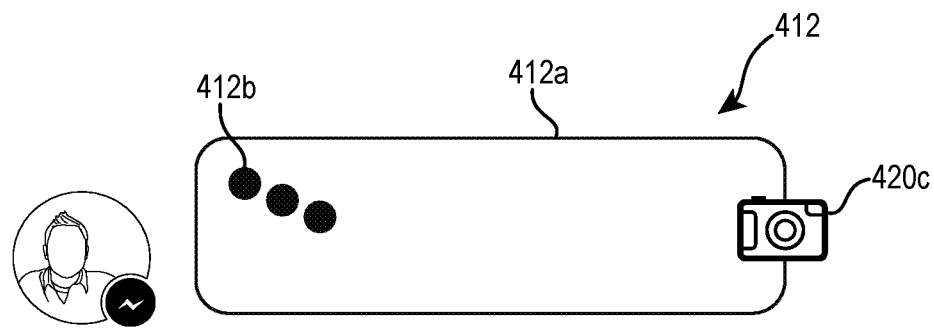

As described above, FIGS. 8A-8C show the message composition indicator 412 displayed with three different graphical indicators (i.e., 420*a*, 420*b*, and 420*c*, respectively). As described above, FIG. 8A shows a graphical searching indicator 420*a* indicating when the user composing the message is searching for secondary content. Further described above, FIG. 8B shows a graphical attaching indicator 420*b* indicating when the user composing the message is attaching secondary content to the message, and FIG. 8C shows a graphical image capturing indicator 420*c* indicating when the user composing the message is utilizing an image capturing device to capture an image to include in the message. In one or more embodiments, the graphical indicators 420a-420c shown in FIGS. 8A-8C are displayed as icons in conjunction the message composition indicator 412. In other embodiments, the graphical indicators 420a-420c may be representations displayed to the user of client computing device 400 within messaging GUI 404 to indicate different actions taken by the user composing the message during the time he or she is composing the message.

Figure 9:
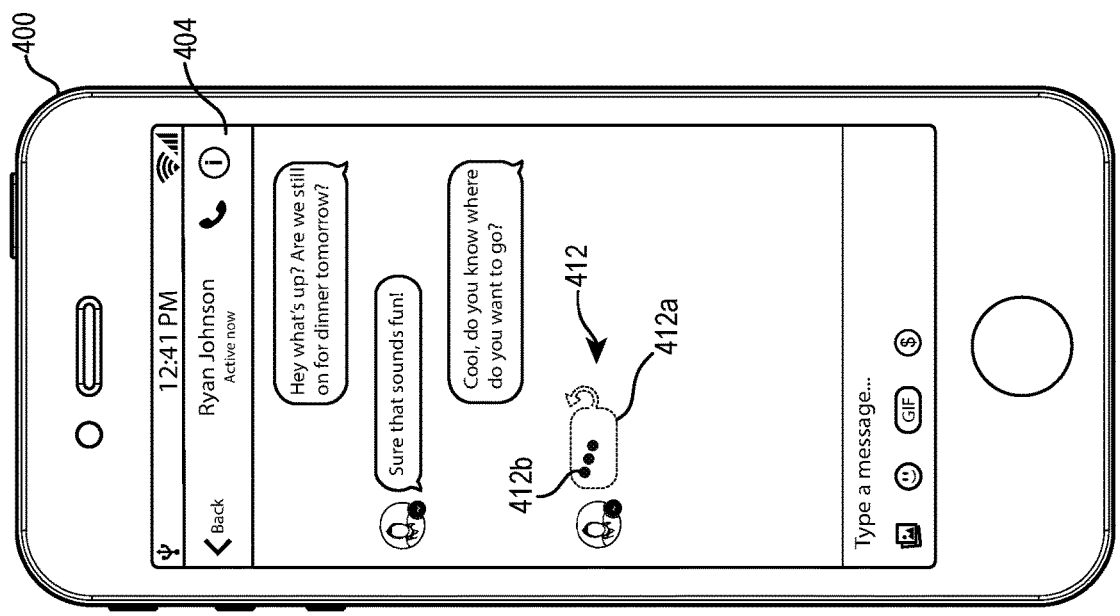
FIG. 9 illustrates a graphical user interface including another example message composition indicator in accordance with one or more embodiments.

As shown in FIG. 9, the message composition indicator 412 indicates to the user of the client computing device 400 that the user composing the message is currently composing a message to a different user—i.e., a user other than the user of the client computing device 400. The message composition indicator 412 is displayed within the messaging GUI 404 to the user of the client computing device 400 and indicates to the user of the client computing device 400 that the user composing the message is composing the message to a third user. Such indication is displayed within messaging GUI 404 as a graphic, text, or other representation indicative of the action undertaken by the user composing the message that he or she is composing the message to a user other than the user of the client computing device 400, such as, for example, the dotted graphical bar 412a with the curved arrow shown in FIG. 9.

FIGS. 1-9, the corresponding text, and the examples, provide a number of different methods, systems, and devices for providing a message composition indicator. In addition to the foregoing, embodiments can also be described in terms of flowcharts comprising acts and steps in a method for accomplishing a particular result. For example, the sequence of FIGS. 3A-3C may be performed with less or more steps/acts or the steps/acts may be performed in differing orders. Additionally, the steps/acts described herein may be repeated or performed in parallel with one another or in parallel with different instances of the same or similar steps/acts.

Figure 10:
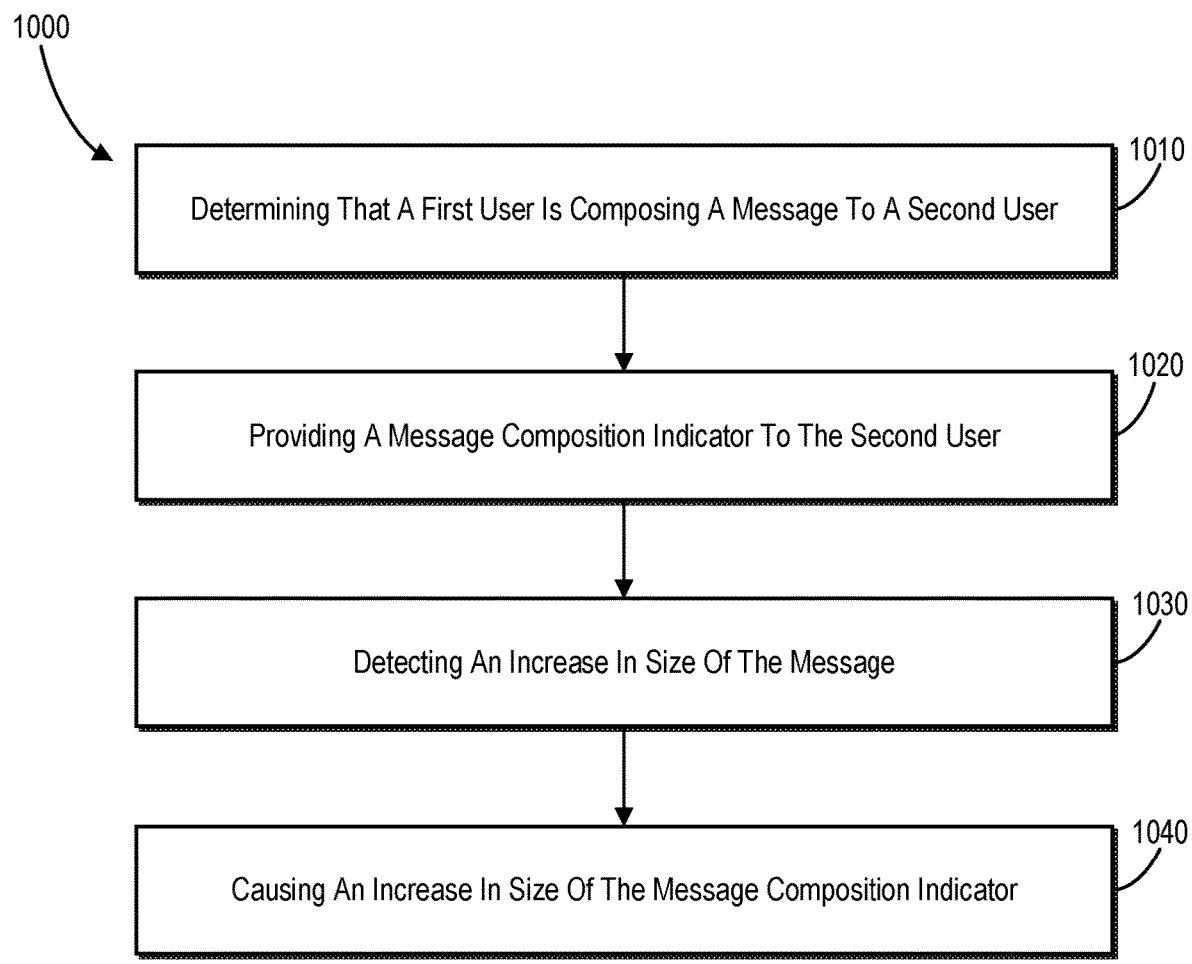
FIG. 10 illustrates a flowchart of a series of acts in a method of providing dynamic message composition indicators in accordance with one or more embodiments.

FIG. 10 illustrates a flowchart of one example method 1000 of providing a message composition indicator via an electronic messaging system. The method 1000 includes an act 1010 of determining that a first user is composing a message to a second user. In particular, the act 1010 involves monitoring electronic messaging system activity (e.g., posts, messages, etc.) for electronic messaging system activity specific to composing a message from the first user to the second user.

The method 1000 also includes an act 1020 of providing a message composition indicator to the second user. In particular, the act 1020 involves providing a graphical bar to the second user indicative of the size of the message the first user is composing. For example, in one or more embodiments, providing a message composition indicator to the second user includes displaying a graphical bar on the client device of the second user as described herein. Also described herein, providing a message composition indicator to the second user includes providing an indication of the size of the message to the client device of the second user.

The method 1000 also includes an act 1030 of detecting an increase in size of the message. In particular, the act 1030 involves receiving, from the client device of the first user, an indication of the size of the message. Additionally or alternatively, detecting an increase in size of the message includes detecting, by the electronic messaging system, the size of the message the first user is composing. In one or more embodiments, detecting an increase in size of the message via the electronic messaging system includes detecting an increase in the number of characters in the message (see e.g., FIGS. 3-5). Alternatively, detecting an increase in size of the message includes detecting an increase in the physical length of the message. Alternatively still, detecting an increase in size of the message includes detecting an increase in the file size of the message. In at least one embodiment, the method 1000 further includes detecting that the first user is searching for secondary content to include in the message. In the same or other embodiments, the method 1000 further includes detecting that the first user is attaching secondary content to the message. In still other embodiments, the method 1000 includes detecting that the first user is utilizing an image capturing device to capture an image to include in the message.

The method 1000 further includes an act 1040 of causing the graphical bar to increase in size. In particular, the act 1040 involves expanding the message composition indicator in a horizontal direction as described above. For example, the message composition indicator can continuously expand horizontally, keeping pace with the increasing size of the message in real time as the first user types the message. In some embodiments, the message composition indicator expands in increments equal to the length of each word each time the first user enters a space or other delineator before composing a subsequent word. Alternatively, the message composition indicator can expand horizontally in predefined increments each time the first user types a predefined number of characters. Alternatively still, the message composition indicator can expand horizontally in arbitrary increments as the first user types the message. In some embodiments, the act 1040 also involves expanding the message composition indicator in a vertical direction as described above. For example, the message composition indicator can expand vertically when the first user enters a new line of text within the message or when the message reaches a certain character count. In the same or other embodiments, the message composition indicator expands vertically with each new line added to the message. In still other embodiments, to maintain a sense of semi-transparence within the communication between users, the graphical bar is limited to a certain vertical size so that the graphical bar does not expand in the vertical direction beyond a certain height, regardless of whether the user composing the message continues to add message content.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
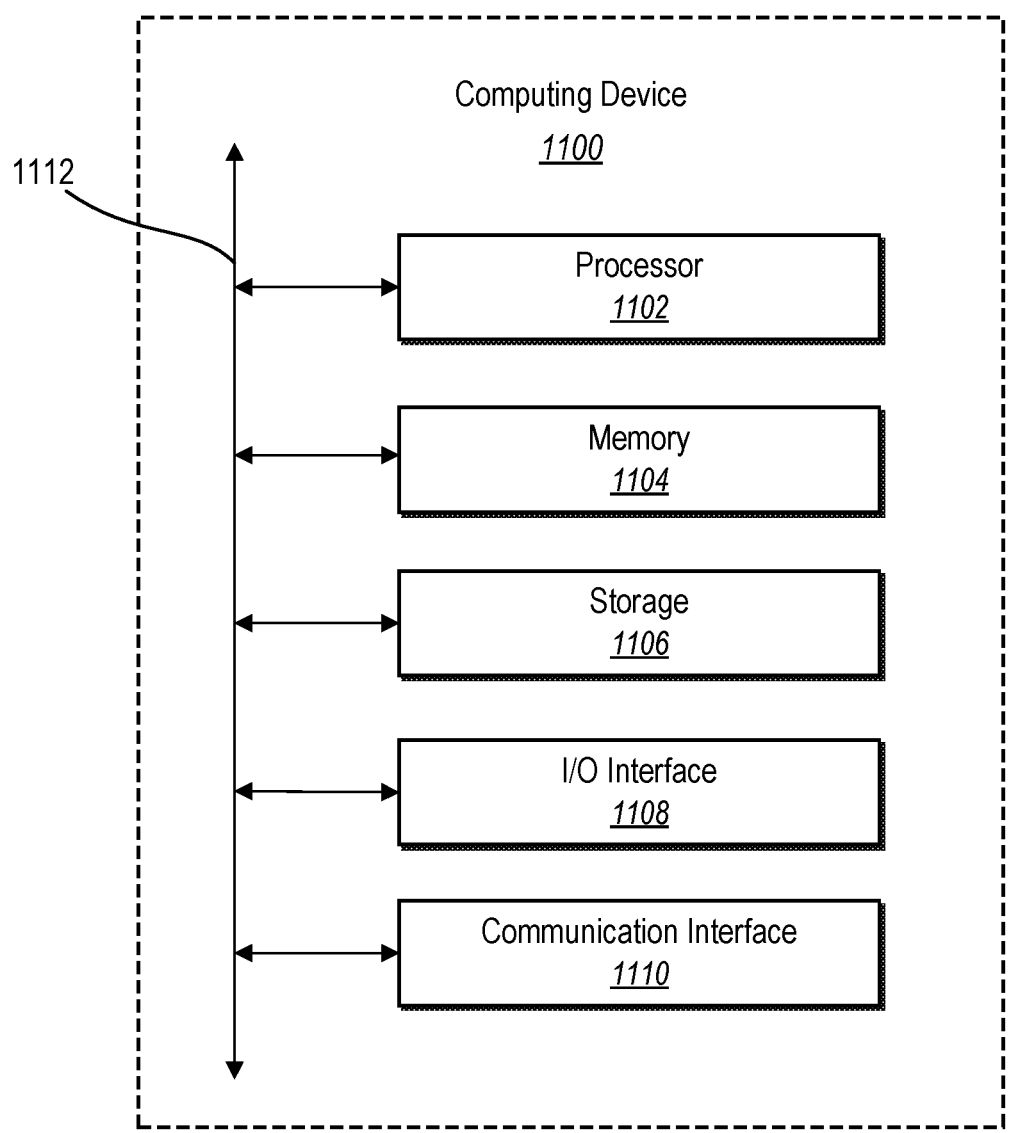
FIG. 11 illustrates a block diagram of an exemplary computing device in accordance with one or more embodiments.

FIG. 11 illustrates a block diagram of exemplary computing device 1100 that may be configured to perform one or more of the processes described above. One will appreciate that one or more computing devices such as the computing device 1100 may implement the system 1100. As shown by FIG. 11, the computing device 1100 can comprise a processor 1102, a memory 1104, a storage device 1106, an I/O interface 1108, and a communication interface 1110, which may be communicatively coupled by way of a communication infrastructure 1112. While an exemplary computing device 1100 is shown in FIG. 11, the components illustrated in FIG. 11 are not intended to be limiting. Additional or alternative components may be used in other embodiments. Furthermore, in certain embodiments, the computing device 1100 can include fewer components than those shown in FIG. 11. Components of the computing device 1100 shown in FIG. 11 will now be described in additional detail.

In one or more embodiments, the processor 1102 includes hardware for executing instructions, such as those making up a computer program. As an example and not by way of limitation, to execute instructions, the processor 1102 may retrieve (or fetch) the instructions from an internal register, an internal cache, the memory 1104, or the storage device 1106 and decode and execute them. In one or more embodiments, the processor 1102 may include one or more internal caches for data, instructions, or addresses. As an example and not by way of limitation, the processor 1102 may include one or more instruction caches, one or more data caches, and one or more translation lookaside buffers (TLBs). Instructions in the instruction caches may be copies of instructions in the memory 1104 or the storage 1106.

The memory 1104 may be used for storing data, metadata, and programs for execution by the processor(s). The memory 1104 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1104 may be internal or distributed memory.

The storage device 1106 includes storage for storing data or instructions. As an example and not by way of limitation, storage device 1106 can comprise a non-transitory storage medium described above. The storage device 1106 may include a hard disk drive (HDD), a floppy disk drive, flash memory, an optical disc, a magneto-optical disc, magnetic tape, or a Universal Serial Bus (USB) drive or a combination of two or more of these. The storage device 1106 may include removable or non-removable (or fixed) media, where appropriate. The storage device 1106 may be internal or external to the computing device 1100. In one or more embodiments, the storage device 1106 is non-volatile, solid-state memory. In other embodiments, the storage device 1106 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 1108 allows a user to provide input to, receive output from, and otherwise transfer data to and receive data from computing device 1100. The I/O interface 1108 may include a mouse, a keypad or a keyboard, a touch screen, a camera, an optical scanner, network interface, modem, other known I/O devices or a combination of such I/O interfaces. The I/O interface 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1108 is configured to provide graphical data to a display for presentation to a user. The graphical data may be representative of one or more graphical user interfaces and/or any other graphical content as may serve a particular implementation.

The communication interface 1110 can include hardware, software, or both. In any event, the communication interface 1110 can provide one or more interfaces for communication (such as, for example, packet-based communication) between the computing device 1100 and one or more other computing devices or networks. As an example and not by way of limitation, the communication interface 1110 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 1110 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 1110 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 1110 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 1112 may include hardware, software, or both that couples components of the computing device 1100 to each other. As an example and not by way of limitation, the communication infrastructure 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, the system 100 can comprise an electronic messaging system. An electronic messaging system may enable its users (such as persons or organizations) to interact with the system and with each other. The electronic messaging system may, with input from a user, create and store in the electronic messaging system a user profile associated with the user. The user profile may include demographic information, communication-channel information, and information on personal interests of the user. The electronic messaging system may also, with input from a user, create and store a record of relationships of the user with other users of the electronic messaging system, as well as provide services (e.g., posts, photo-sharing, video-sharing, event organization, messaging, games, or advertisements) to facilitate social interaction between or among users.

The electronic messaging system may store records of users and relationships between users in a social graph comprising a plurality of nodes and a plurality of edges connecting the nodes. The nodes may comprise a plurality of user nodes and a plurality of concept nodes. A user node of the social graph may correspond to a user of the electronic messaging system. A user may be an individual (human user), an entity (e.g., an enterprise, business, or third party application), or a group (e.g., of individuals or entities). A user node corresponding to a user may comprise information provided by the user and information gathered by various systems, including the electronic messaging system.

For example, the user may provide his or her name, profile picture, city of residence, contact information, birth date, gender, marital status, family status, employment, educational background, preferences, interests, and other demographic information to be included in the user node. Each user node of the social graph may have a corresponding web page (typically known as a profile page). In response to a request including a user name, the electronic messaging system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

A concept node may correspond to a concept of the electronic messaging system. For example, a concept can represent a real-world entity, such as a movie, a song, a sports team, a celebrity, a group, a restaurant, or a place or a location. An administrative user of a concept node corresponding to a concept may create or update the concept node by providing information of the concept (e.g., by filling out an online form), causing the electronic messaging system to associate the information with the concept node. For example and without limitation, information associated with a concept can include a name or a title, one or more images (e.g., an image of cover page of a book), a web site (e.g., an URL address) or contact information (e.g., a phone number, an email address). Each concept node of the social graph may correspond to a web page. For example, in response to a request including a name, the electronic messaging system can access a concept node corresponding to the name, and construct a web page including the name and other information associated with the concept.

An edge between a pair of nodes may represent a relationship between the pair of nodes. For example, an edge between two user nodes can represent a friendship between two users. For another example, the electronic messaging system may construct a web page (or a structured document) of a concept node (e.g., a restaurant, a celebrity), incorporating one or more selectable option or selectable elements (e.g., "like", "check in") in the web page. A user can access the page using a web browser hosted by the user's client device and select a selectable option or selectable element, causing the client device to transmit to the electronic messaging system a request to create an edge between a user node of the user and a concept node of the concept, indicating a relationship between the user and the concept (e.g., the user checks in a restaurant, or the user "likes" a celebrity).

As an example, a user may provide (or change) his or her city of residence, causing the electronic messaging system to create an edge between a user node corresponding to the user and a concept node corresponding to the city declared by the user as his or her city of residence. In addition, the degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends."

An electronic messaging system may support a variety of applications, such as photo sharing, on-line calendars and events, gaming, instant messaging, and advertising. For example, the electronic messaging system may also include media sharing capabilities. Also, the electronic messaging system may allow users to post photographs and other multimedia content items to a user's profile page (typically known as "wall posts" or "timeline posts") or in a photo album, both of which may be accessible to other users of the electronic messaging system depending upon the user's configured privacy settings. The electronic messaging system may also allow users to configure events. For example, a first user may configure an event with attributes including time and date of the event, location of the event and other users invited to the event. The invited users may receive invitations to the event and respond (such as by accepting the invitation or declining it). Furthermore, the electronic messaging system may allow users to maintain a personal calendar. Similarly to events, the calendar entries may include times, dates, locations and identities of other users.

Figure 12:
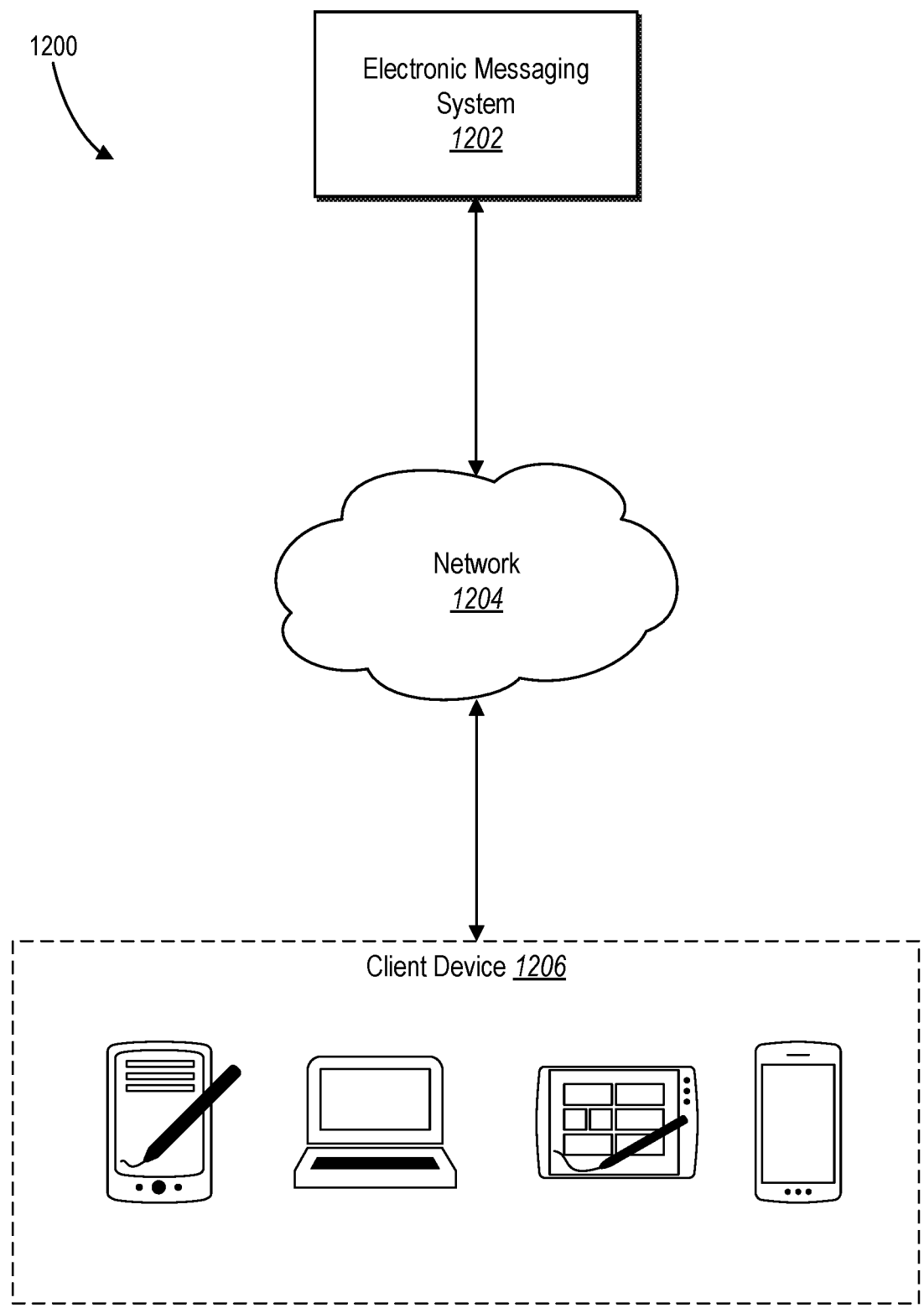
FIG. 12 is an example network environment of an electronic messaging system in accordance with one or more embodiments.

FIG. 12 illustrates an example network environment 1200 of an electronic messaging system. Network environment 1200 includes a client system 1206, and an electronic messaging system 1202 connected to each other by a network 1204. Although FIG. 12 illustrates a particular arrangement of client system 1206, electronic messaging system 1202, and network 1204, this disclosure contemplates any suitable arrangement of client system 1206, electronic messaging system 1202, and network 1204. As an example and not by way of limitation, two or more of client system 1206 and electronic messaging system 1202 may be connected to each other directly, bypassing network 1204. As another example, two or more of client system 1206 and electronic messaging system 1202 may be physically or logically co-located with each other in whole or in part. Moreover, although FIG. 12 illustrates a particular number of client systems 1206, electronic messaging systems 1202, and networks 1204, this disclosure contemplates any suitable number of client systems 1206, electronic messaging systems 1202, and networks 1204. As an example and not by way of limitation, network environment 1200 may include multiple client system 1206, electronic messaging systems 1202, and networks 1204.

This disclosure contemplates any suitable network 1204. As an example and not by way of limitation, one or more portions of network 1204 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1204 may include one or more networks 1204.

Links may connect client system 1206 and electronic messaging system 1202 to communication network 1204 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1200. One or more first links may differ in one or more respects from one or more second links.

In particular embodiments, client system 1206 may be an electronic device including hardware, software, or embedded logic components or a combination of two or more such components and capable of carrying out the appropriate functionalities implemented or supported by client system 1206. As an example and not by way of limitation, a client system 1206 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 1206. A client system 1206 may enable a network user at client system 1206 to access network 1204. A client system 1206 may enable its user to communicate with other users at other client systems 1206.

In particular embodiments, client system 1206 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 1206 may enter a Uniform Resource Locator (URL) or other address directing the web browser to a particular server (such as server), and the web browser may generate a Hyper Text Transfer Protocol (HTTP) request and communicate the HTTP request to server. The server may accept the HTTP request and communicate to client system 1206 one or more Hyper Text Markup Language (HTML) files responsive to the HTTP request. Client system 1206 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, electronic messaging system 1202 may be a network-addressable computing system that can host an online social network. Electronic messaging system 1202 may generate, store, receive, and send social-networking data, such as, for example, user-profile data, concept-profile data, social-graph information, or other suitable data related to the online social network. Electronic messaging system 1202 may be accessed by the other components of network environment 1200 either directly or via network 1204. In particular embodiments, electronic messaging system 1202 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, electronic messaging system 1202 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client system 1206 or an electronic messaging system 1202 to manage, retrieve, modify, add, or delete, the information stored in data store.

In particular embodiments, electronic messaging system 1202 may store one or more social graphs in one or more data stores. In particular embodiments, a social graph may include multiple nodes—which may include multiple user nodes (each corresponding to a particular user) or multiple concept nodes (each corresponding to a particular concept)—and multiple edges connecting the nodes. Electronic messaging system 1202 may provide users of the online social network the ability to communicate and interact with other users. In particular embodiments, users may join the online social network via an electronic messaging system 1202 and then add connections (e.g., relationships) to a number of other users of electronic messaging system 1202 whom they want to be connected to. Herein, the term "friend" may refer to any other user of electronic messaging system 1202 with whom a user has formed a connection, association, or relationship via an electronic messaging system 1202.

In particular embodiments, electronic messaging system 1202 may provide users with the ability to take actions on various types of items or objects, supported by electronic messaging system 1202. As an example and not by way of limitation, the items and objects may include groups or social networks to which users of electronic messaging system 1202 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in electronic messaging system 1202 or by an external system, which is separate from electronic messaging system 1202 and coupled to electronic messaging system 1202 via a network 1204.

In particular embodiments, electronic messaging system 1202 may be capable of linking a variety of entities. As an example and not by way of limitation, electronic messaging system 1202 may enable users to interact with each other as well as receive content from other entities, or to allow users to interact with these entities through an application programming interfaces (API) or other communication channels.

In particular embodiments, electronic messaging system 1202 also includes user-generated content objects, which may enhance a user's interactions with electronic messaging system 1202. User-generated content may include anything a user can add, upload, send, or "post" to electronic messaging system 1202. As an example and not by way of limitation, a user communicates posts to electronic messaging system 1202 from a client system 1206. Posts may include data such as status updates or other textual data, location information, photos, videos, links, music or other similar data or media. Content may also be added to electronic messaging system 1202 by a third-party through a "communication channel," such as a message feed or stream.

In particular embodiments, electronic messaging system 1202 may include a variety of servers, sub-systems, programs, modules, logs, and data stores. In particular embodiments, electronic messaging system 1202 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Electronic messaging system 1202 may also include suitable components such as network interfaces, security mechanisms, load balancers, failover servers, management-and-network-operations consoles, other suitable components, or any suitable combination thereof. In particular embodiments, electronic messaging system 1202 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking electronic messaging system 1202 to one or more client systems 1206 via network 1204. The web server may include a mail server or other messaging functionality for receiving and routing messages between electronic messaging system 1202 and one or more client systems 1206. An action logger may be used to receive communications from a web server about a user's actions on or off electronic messaging system 1202. In conjunction with the action log, a third-party-content-object log may be maintained of user exposures to third-party-content objects. A notification controller may provide information regarding content objects to a client system 1206. Information may be pushed to a client system 1206 as notifications, or information may be pulled from client system 1206 responsive to a request received from client system 1206. Authorization servers may be used to enforce one or more privacy settings of the users of electronic messaging system 1202. A privacy setting of a user determines how particular information associated with a user can be shared. The authorization server may allow users to opt in to or opt out of having their actions logged by electronic messaging system 1202 or shared with other systems, such as, for example, by setting appropriate privacy settings. Third-party-content-object stores may be used to store content objects received from third parties. Location stores may be used for storing location information received from client systems 1206 associated with users. Advertisement-pricing modules may combine social information, the current time, location information, or other suitable information to provide relevant advertisements, in the form of notifications, to a user.

Figure 13:
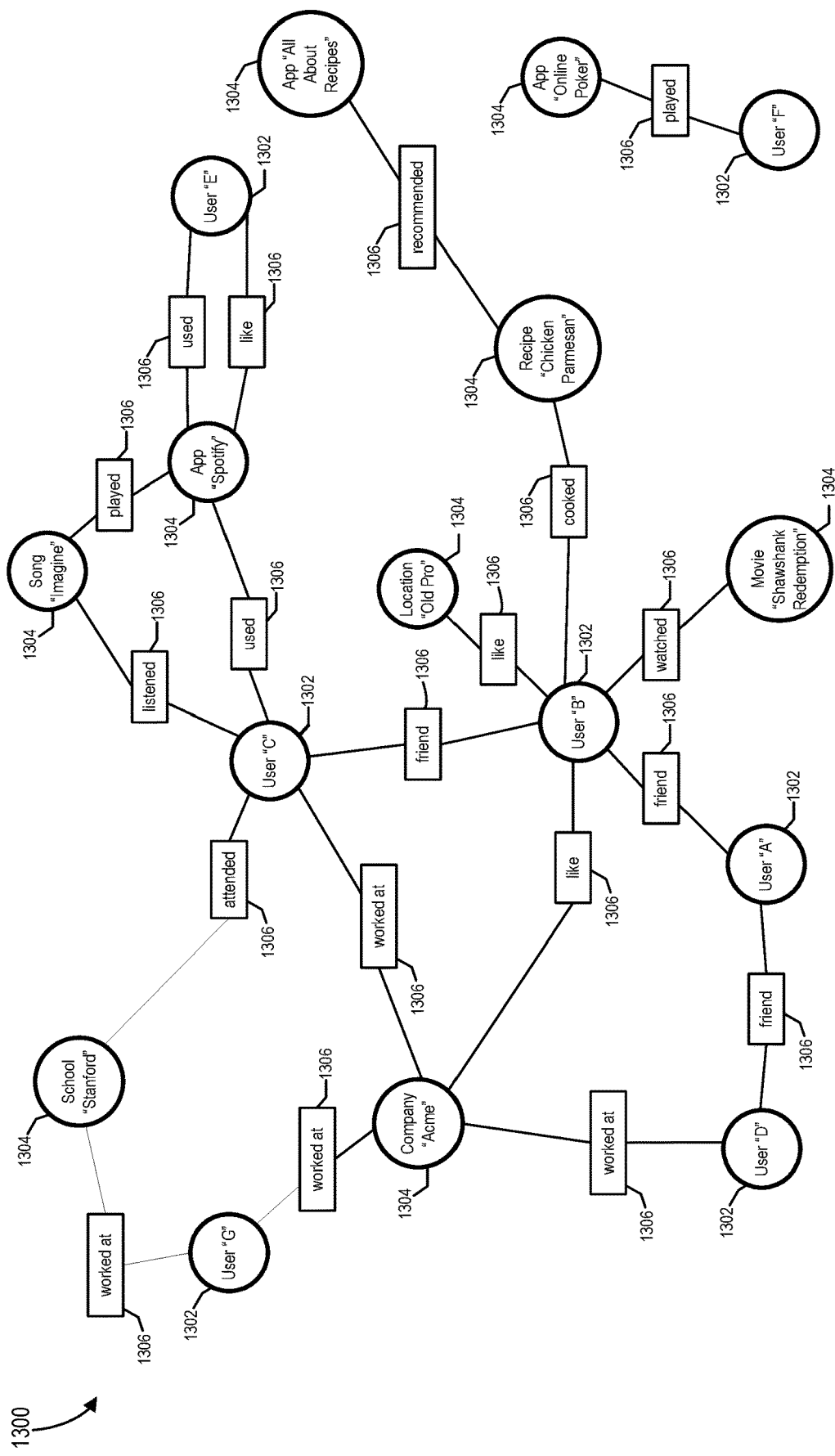
FIG. 13 illustrates a social graph in accordance with one or more embodiments.

FIG. 13 illustrates example social graph 1300. In particular embodiments, electronic messaging system 1202 may store one or more social graphs 1300 in one or more data stores. In particular embodiments, social graph 1300 may include multiple nodes—which may include multiple user nodes 1302 or multiple concept nodes 1304—and multiple edges 1306 connecting the nodes. Example social graph 1300 illustrated in FIG. 13 is shown, for didactic purposes, in a two-dimensional visual map representation. In particular embodiments, an electronic messaging system 1202 or client system 1206 may access social graph 1300 and related social-graph information for suitable applications. The nodes and edges of social graph 1300 may be stored as data objects, for example, in a data store (such as a social-graph database). Such a data store may include one or more searchable or query able indexes of nodes or edges of social graph 1300.

In particular embodiments, a user node 1302 may correspond to a user of electronic messaging system 1202. As an example and not by way of limitation, a user may be an individual (human user), an entity (e.g., an enterprise, business, or third-party application), or a group (e.g., of individuals or entities) that interacts or communicates with or over electronic messaging system 1202. In particular embodiments, when a user registers for an account with electronic messaging system 1202, electronic messaging system 1202 may create a user node 1302 corresponding to the user, and store the user node 1302 in one or more data stores. Users and user nodes 1302 described herein may, where appropriate, refer to registered users and user nodes 1302 associated with registered users. In addition or as an alternative, users and user nodes 1302 described herein may, where appropriate, refer to users that have not registered with electronic messaging system 1202. In particular embodiments, a user node 1302 may be associated with information provided by a user or information gathered by various systems, including electronic messaging system 1202. As an example and not by way of limitation, a user may provide his or her name, profile picture, contact information, birth date, sex, marital status, family status, employment, education background, preferences, interests, or other demographic information. In particular embodiments, a user node 1302 may be associated with one or more data objects corresponding to information associated with a user. In particular embodiments, a user node 1302 may correspond to one or more webpages.

In particular embodiments, a concept node 1304 may correspond to a concept. As an example and not by way of limitation, a concept may correspond to a place (such as, for example, a movie theater, restaurant, landmark, or city); a website (such as, for example, a website associated with electronic messaging system 1202 or a third-party website associated with a web-application server); an entity (such as, for example, a person, business, group, sports team, or celebrity); a resource (such as, for example, an audio file, video file, digital photo, text file, structured document, or application) which may be located within electronic messaging system 1202 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 1304 may be associated with information of a concept provided by a user or information gathered by various systems, including electronic messaging system 1202. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1304 may be associated with one or more data objects corresponding to information associated with concept node 1304. In particular embodiments, a concept node 1304 may correspond to one or more webpages.

In particular embodiments, a node in social graph 1300 may represent or be represented by a webpage (which may be referred to as a "profile page"). Profile pages may be hosted by or accessible to electronic messaging system 1202. Profile pages may also be hosted on third-party websites. As an example and not by way of limitation, a profile page corresponding to a particular external webpage may be the particular external webpage and the profile page may correspond to a particular concept node 1304. Profile pages may be viewable by all or a selected subset of other users. As an example and not by way of limitation, a user node 1302 may have a corresponding user-profile page in which the corresponding user may add content, make declarations, or otherwise express himself or herself. As another example and not by way of limitation, a concept node 1304 may have a corresponding concept-profile page in which one or more users may add content, make declarations, or express themselves, particularly in relation to the concept corresponding to concept node 1304.

In particular embodiments, a concept node 1304 may represent a third-party webpage. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 1206 to send to electronic messaging system 1202 a message indicating the user's action. In response to the message, electronic messaging system 1202 may create an edge (e.g., an "eat" edge) between a user node 1302 corresponding to the user and a concept node 1304 corresponding to the third-party webpage or resource and store edge 1306 in one or more data stores.

In particular embodiments, a pair of nodes in social graph 1300 may be connected to each other by one or more edges 1306. An edge 1306 connecting a pair of nodes may represent a relationship between the pair of nodes. In particular embodiments, an edge 1306 may include or represent one or more data objects or attributes corresponding to the relationship between a pair of nodes. As an example and not by way of limitation, a first user may indicate that a second user is a "friend" of the first user. In response to this indication, electronic messaging system 1202 may send a "friend request" to the second user. If the second user confirms the "friend request," electronic messaging system 1202 may create an edge 1306 connecting the first user's user node 1302 to the second user's user node 1302 in social graph 1300 and store edge 1306 as social-graph information in one or more of data stores. In the example of FIG. 13, social graph 1300 includes an edge 1306 indicating a friend relation between user nodes 1302 of user "A" and user "B" and an edge indicating a friend relation between user nodes 1302 of user "C" and user "B." Although this disclosure describes or illustrates particular edges 1306 with particular attributes connecting particular user nodes 1302, this disclosure contemplates any suitable edges 1306 with any suitable attributes connecting user nodes 1302. As an example and not by way of limitation, an edge 1306 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 1300 by one or more edges 1306.

In particular embodiments, an edge 1306 between a user node 1302 and a concept node 1304 may represent a particular action or activity performed by a user associated with user node 1302 toward a concept associated with a concept node 1304. As an example and not by way of limitation, as illustrated in FIG. 13, a user may "like," "attended," "played," "listened," "cooked," "worked at," or "watched" a concept, each of which may correspond to a edge type or subtype. A concept-profile page corresponding to a concept node 1304 may include, for example, a selectable "check in" icon (such as, for example, a clickable "check in" icon) or a selectable "add to favorites" icon. Similarly, after a user clicks these icons, electronic messaging system 1202 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, electronic messaging system 1202 may create a "listened" edge 1306 and a "used" edge (as illustrated in FIG. 13) between user nodes 1302 corresponding to the user and concept nodes 1304 corresponding to the song and application to indicate that the user listened to the song and used the application. Moreover, electronic messaging system 1202 may create a "played" edge 1306 (as illustrated in FIG. 13) between concept nodes 1304 corresponding to the song and the application to indicate that the particular song was played by the particular application. In this case, "played" edge 1306 corresponds to an action performed by an external application (SPOTIFY) on an external audio file (the song "Imagine"). Although this disclosure describes particular edges 1306 with particular attributes connecting user nodes 1302 and concept nodes 1304, this disclosure contemplates any suitable edges 1306 with any suitable attributes connecting user nodes 1302 and concept nodes 1304. Moreover, although this disclosure describes edges between a user node 1302 and a concept node 1304 representing a single relationship, this disclosure contemplates edges between a user node 1302 and a concept node 1304 representing one or more relationships. As an example and not by way of limitation, an edge 1306 may represent both that a user likes and has used at a particular concept. Alternatively, another edge 1306 may represent each type of relationship (or multiples of a single relationship) between a user node 1302 and a concept node 1304 (as illustrated in FIG. 13 between user node 1302 for user "E" and concept node 1304 for "SPOTIFY").

In particular embodiments, electronic messaging system 1202 may create an edge 1306 between a user node 1302 and a concept node 1304 in social graph 1300. As an example and not by way of limitation, a user viewing a concept-profile page (such as, for example, by using a web browser or a special-purpose application hosted by the user's client system 1206) may indicate that he or she likes the concept represented by the concept node 1304 by clicking or selecting a "Like" icon, which may cause the user's client system 1206 to send to electronic messaging system 1202 a message indicating the user's liking of the concept associated with the concept-profile page. In response to the message, electronic messaging system 1202 may create an edge 1306 between user node 1302 associated with the user and concept node 1304, as illustrated by "like" edge 1306 between the user and concept node 1304. In particular embodiments, electronic messaging system 1202 may store an edge 1306 in one or more data stores. In particular embodiments, an edge 1306 may be automatically formed by electronic messaging system 1202 in response to a particular user action. As an example and not by way of limitation, if a first user uploads a picture, watches a movie, or listens to a song, an edge 1306 may be formed between user node 1302 corresponding to the first user and concept nodes 1304 corresponding to those concepts. Although this disclosure describes forming particular edges 1306 in particular manners, this disclosure contemplates forming any suitable edges 1306 in any suitable manner.

In particular embodiments, electronic messaging system 1202 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, electronic messaging system 1202 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, electronic messaging system 1202 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 1000%). To calculate the coefficient of a user towards a particular object, the rating assigned to the user's actions may comprise, for example, 60% of the overall coefficient, while the relationship between the user and the object may comprise 40% of the overall coefficient. In particular embodiments, the electronic messaging system 1202 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, electronic messaging system 1202 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, electronic messaging system 1202 may calculate a coefficient based on a user's actions. Electronic messaging system 1202 may monitor such actions on the online social network, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, electronic messaging system 1202 may calculate a coefficient based on the user's actions with particular types of content. The content may be associated with the online social network, or another suitable system. The content may include users, profile pages, posts, news stories, headlines, instant messages, chat room conversations, emails, advertisements, pictures, video, music, other suitable objects, or any combination thereof. Electronic messaging system 1202 may analyze a user's actions to determine whether one or more of the actions indicate an affinity for subject matter, content, other users, and so forth. As an example and not by way of limitation, if a user may make frequently posts content related to "coffee" or variants thereof, electronic messaging system 1202 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, electronic messaging system 1202 may calculate a coefficient based on the type of relationship between particular objects. Referencing the social graph 1300, electronic messaging system 1202 may analyze the number and/or type of edges 1306 connecting particular user nodes 1302 and concept nodes 1304 when calculating a coefficient. As an example and not by way of limitation, user nodes 1302 that are connected by a spouse-type edge (representing that the two users are married) may be assigned a higher coefficient than a user node 1302 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, electronic messaging system 1202 may determine that the user has a higher coefficient with respect to the first photo than the second photo because having a tagged-in-type relationship with content may be assigned a higher weight and/or rating than having a like-type relationship with content. In particular embodiments, electronic messaging system 1202 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, electronic messaging system 1202 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 1300. As an example and not by way of limitation, social-graph entities that are closer in the social graph 1300 (i.e., fewer degrees of separation) may have a higher coefficient than entities that are further apart in the social graph 1300.

In particular embodiments, electronic messaging system 1202 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client system 1206 of the user). A first user may be more interested in other users or concepts that are closer to the first user. As an example and not by way of limitation, if a user is one mile from an airport and two miles from a gas station, electronic messaging system 1202 may determine that the user has a higher coefficient for the airport than the gas station based on the proximity of the airport to the user.

In particular embodiments, electronic messaging system 1202 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, electronic messaging system 1202 may provide information that is relevant to user's interests and current circumstances, increasing the likelihood that they will find such information of interest. In particular embodiments, electronic messaging system 1202 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, electronic messaging system 1202 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, electronic messaging system 1202 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, or from another suitable system. In response to the request, electronic messaging system 1202 may calculate the coefficient (or access the coefficient information if it has previously been calculated and stored). In particular embodiments, electronic messaging system 1202 may measure an affinity with respect to a particular process. Different processes (both internal and external to the online social network) may request a coefficient for a particular object or set of objects. Electronic messaging system 1202 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/9,713,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 1304 corresponding to a particular photo may have a privacy setting specifying that the photo may only be accessed by users tagged in the photo and their friends. In particular embodiments, privacy settings may allow users to opt in or opt out of having their actions logged by electronic messaging system 1202 or shared with other systems. In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, electronic messaging system 1202 may send a request to the data store for the object. The request may identify the user associated with the request and may only be sent to the user (or a client system 1206 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A method comprising:
   determining, as part of a digital conversation between a first user and a second user and by at least one processor of an electronic messaging system, that the first user is composing a message to the second user using a first client device;
   providing, in response to the determination that the first user is composing the message, a message composition indicator to the second user by way of a second client device to indicate that the first user is composing the message to the second user;
   detecting, as a result of one or more actions of the first user while composing the message, an increase in size of the message;
   in response to and in accordance with the detected increase in size of the message, causing an increase in size of the message composition indicator provided to the second user;
   determining that the first user has stopped composing the message and begins composing a different message to a third user who is not participating in the digital conversation; and
   in response to the determination that the first user is composing the different message to the third user, modifying an appearance of the message composition indicator to indicate to the second user that the first user is composing the different message to the third user.

2. The method of claim 1, wherein the message composition indicator comprises a graphical bar, and wherein causing an increase in size of the message composition indicator comprises causing an increase in size of the graphical bar.

3. The method of claim 2, wherein causing the increase in size of the graphical bar comprises causing the graphical bar to expand in a horizontal direction.

4. The method of claim 3, wherein causing the increase in size of the graphical bar comprises causing the graphical bar to expand by an increment equal to a length of a word added to the message representing the increase in size of the message.

5. The method of claim 3, wherein causing the increase in size of the graphical bar comprises causing the graphical bar to expand by a set increment equal to a predefined number of characters, irrespective of the increase in size of the message.

6. The method of claim 3, wherein causing the increase in size of the graphical bar comprises causing the graphical bar to expand by an arbitrary increment up to a length of a word added to the message representing the increase in size of the message.

7. The method of claim 3, wherein causing the increase in size of the graphical bar further comprises causing the graphical bar to expand in a vertical direction in response to the increase in size of the message comprising an addition of a second line to the message.

8. The method of claim 7, wherein causing the increase in size of the graphical bar comprises causing the graphical bar to double in height.

9. The method of claim 1, wherein detecting the increase in size of the message comprises detecting a triggering event.

10. The method of claim 9, wherein detecting the triggering event comprises detecting at least one of an addition of a space to the message, an addition of a comma to the message, an addition of a period to the message, an addition of a threshold number of characters to the message, an addition of a threshold number words to the message, passage of a time interval, or a selection of an option to add content to the message.

11. The method of claim 1, wherein detecting the increase in size of the message comprises detecting at least one of an increase in a number of characters within the message, an increase in a physical length of the message, or an increase in a file size of the message.

12. The method of claim 1, further comprising:
detecting that the first user is searching for secondary content to include in the message; and
in response to detecting that the first user is searching for secondary content to include in the message, adding a graphical element to the message composition indicator to indicate that the first user is searching for secondary content to include in the message.

13. The method of claim 1, further comprising:
detecting that the first user is including secondary content in the message; and
in response to detecting that the first user is including secondary content in the message, adding a graphical element to the message composition indicator to indicate that the first user is including the secondary content in the message.

14. The method of claim 13, wherein the secondary content comprises at least one of an image, a video clip, audio, an EMOJI, a file, a link, or a GIF.

15. The method of claim 1, further comprising:
detecting that the first user is capturing an image to include in the message; and
in response to detecting that the first user is capturing an image to include in the message, adding a graphical element to the message composition indicator to indicate that the first user is capturing the image to include in the message.

16. The method of claim 1, wherein the message composition comprises an indication of a rate of growth of the message.

17. The method of claim 1, wherein modifying the appearance of the message composition indicator to indicate to the second user that the first user is composing the different message to the third user comprises generating a graphical element that indicates that the first user is composing the different message to the third user.

18. The method of claim 1, further comprising:
detecting that the first user deletes content from the message; and
in response to detecting that the first user deletes content from the message, not causing a decrease in size of the message composition indicator.

19. A system comprising:
at least one processor; and
a non-transitory computer readable medium comprising instructions that, when executed by the at least one processor, cause the system to:
determine, as part of a digital conversation between a first user and a second user and by at least one processor of an electronic messaging system, that the first user is composing a message to the second user using a first client device;
display, in response to the determination that the first user is composing the message, a message composition indicator to the second user on a second client device to indicate that the first user is composing the message to the second user;
detect, as a result of on one or more actions of the first user while composing the message, an increase in size of the message;
in response to and in accordance with the detected increase in size of the message, cause an increase in size of the message composition indicator provided to the second user;
determine that the first user has stopped composing the message and begins composing a different message to a third user who is not participating in the digital conversation; and
in response to the determination that the first user is composing the different message to the third user, modify an appearance of the message composition indicator to indicate to the second user that the first user is composing the different message to the third user.

20. A computer readable storage medium having stored thereon computer-executable instructions that, when executed by a processor, cause a computer to:
determine, as part of a digital conversation between a first user and a second user and by at least one processor of an electronic messaging system, that the first user is composing a message to the second user using a first client device;

provide, in response to the determination that the first user is composing the message, a message composition indicator to the second user by way of a second client device to indicate that the first user is composing the message to the second user;

detect, as a result of one or more actions of the first user while composing the message, an increase in size of the message;

in response to and in accordance with the detected increase in size of the message, causing an increase in size of the message composition indicator provided to the second user;

determine that the first user has stopped composing the message and begins composing a different message to a third user who is not participating in the digital conversation; and in response to the determination that the first user is composing the different message to the third user, modify an appearance of the message composition indicator to indicate to the second user that the first user is composing the different message to the third user.

\* \* \* \* \*